(12) United States Patent
Unseld et al.

(10) Patent No.: US 11,193,524 B2
(45) Date of Patent: *Dec. 7, 2021

(54) NUT WITH POLYGONAL SECTION

(71) Applicant: HEWI G. Winker GmbH & Co. KG, Spaichingen (DE)

(72) Inventors: Peter Unseld, Markdorf (DE); Guenther Meßmer, Dürbheim (DE)

(73) Assignee: HEWI G. Winker GmbH & Co. KG, Spaichingen (DE)

( * ) Notice: Subject to any disclaimer, the term of this patent is extended or adjusted under 35 U.S.C. 154(b) by 67 days.

This patent is subject to a terminal disclaimer.

(21) Appl. No.: 15/437,264

(22) Filed: Feb. 20, 2017

(65) Prior Publication Data

US 2017/0159696 A1 Jun. 8, 2017

Related U.S. Application Data

(63) Continuation of application No. 13/753,206, filed on Jan. 29, 2013, now Pat. No. 9,624,962.

(30) Foreign Application Priority Data

Feb. 1, 2012 (DE) .......................... 102012100850.7

(51) Int. Cl.
 *F16B 37/00* (2006.01)
 *B21K 1/70* (2006.01)
 (Continued)

(52) U.S. Cl.
 CPC ............... *F16B 37/00* (2013.01); *B21H 3/08* (2013.01); *B21K 1/707* (2013.01);
 (Continued)

(58) Field of Classification Search
 CPC ..... F16B 39/284; F16B 23/0061; F16B 37/00
 (Continued)

(56) References Cited

U.S. PATENT DOCUMENTS

| 111,996 A | 2/1871 | Washbourne |
|---|---|---|
| 2,440,944 A | 5/1948 | Green |

(Continued)

FOREIGN PATENT DOCUMENTS

| DE | 82098 | 1/1895 |
|---|---|---|
| DE | 2937980 | 6/1981 |

(Continued)

OTHER PUBLICATIONS

B. Buchmayr et al., "Werkstoff-und verfahrenstechnische . . . ", publication, 2008, 7 pages.
U.S. Appl. No. 13/753,206, filed Jan. 29, 2013.

*Primary Examiner* — Flemming Saether
(74) *Attorney, Agent, or Firm* — Reinhart Boerner Van Deuren P.C.

(57) ABSTRACT

In order to optimize a nut and a method for the production of a nut, comprising a nut body which is provided or can be provided with an internal thread and has a polygonal section with a polygonal outer contour which has, on the one hand, edge areas and, on the other hand, key faces which are located between the edge areas and extend in key face planes extending in a manner conforming to standards, in such a manner that it has mechanical properties which are as ideal as possible with as low a weight as possible, it is suggested that the nut body have a plurality of recesses which extend into the nut body in the direction of the bore proceeding from the respective key face planes.

19 Claims, 19 Drawing Sheets

(51) Int. Cl.
*F16B 23/00* (2006.01)
*F16B 33/00* (2006.01)
*F16B 39/284* (2006.01)
*B21H 3/08* (2006.01)

(52) U.S. Cl.
CPC .......... *F16B 23/0061* (2013.01); *F16B 33/00* (2013.01); *F16B 39/284* (2013.01)

(58) Field of Classification Search
USPC ......... 411/277, 282–284, 427, 435, 402, 409
See application file for complete search history.

(56) References Cited

U.S. PATENT DOCUMENTS

| | | | |
|---|---|---|---|
| 2,679,879 A | 6/1954 | Engstrom | |
| 2,931,410 A | 4/1960 | Stoll | |
| 3,277,942 A | 10/1966 | Dwyer | |
| 3,340,920 A | 9/1967 | Johnson | |
| 3,456,704 A | 7/1969 | Johnson | |
| 3,543,826 A | 12/1970 | Fogaard | |
| 4,207,938 A | 6/1980 | Mortus | |
| 4,759,237 A | 7/1988 | Fauchet et al. | |
| 5,324,149 A | 6/1994 | Bainbridge et al. | |
| 6,068,344 A * | 5/2000 | Nether | B60B 3/145 301/35.632 |
| 6,213,885 B1 * | 4/2001 | Bachle | B21H 3/08 411/250 |
| 9,624,962 B2 | 4/2017 | Unseld et al. | |

FOREIGN PATENT DOCUMENTS

| | | |
|---|---|---|
| EP | 0093218 A1 | 11/1983 |
| EP | 0214688 A1 | 3/1987 |
| FR | 1451101 A | 6/1966 |
| GB | 985714 | 4/1963 |

* cited by examiner

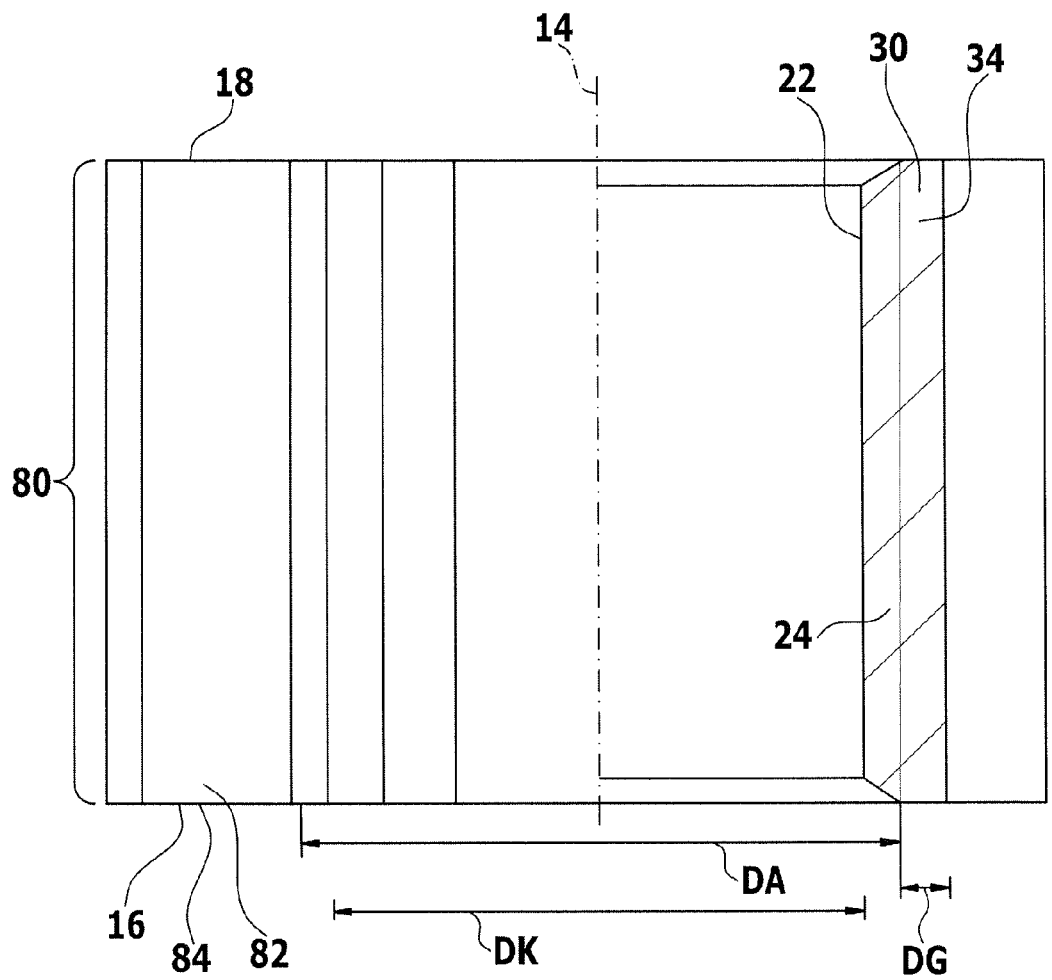
Fig.3
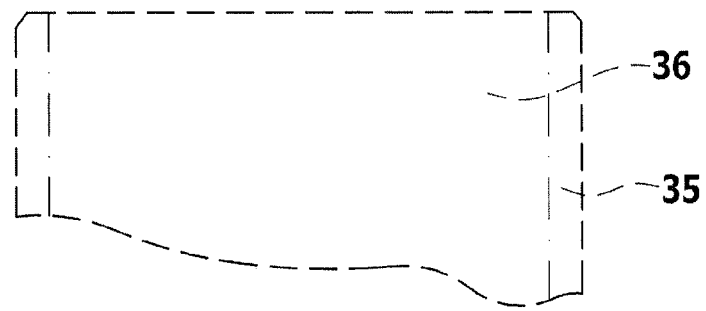

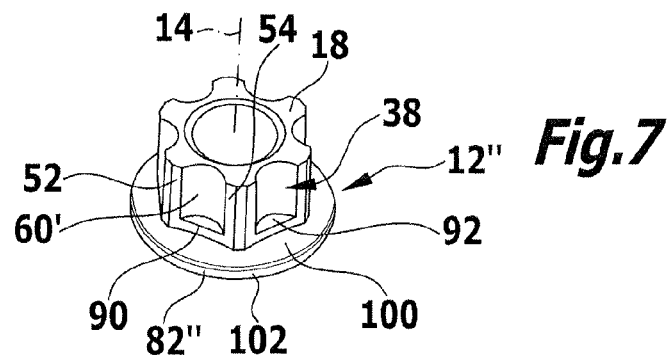
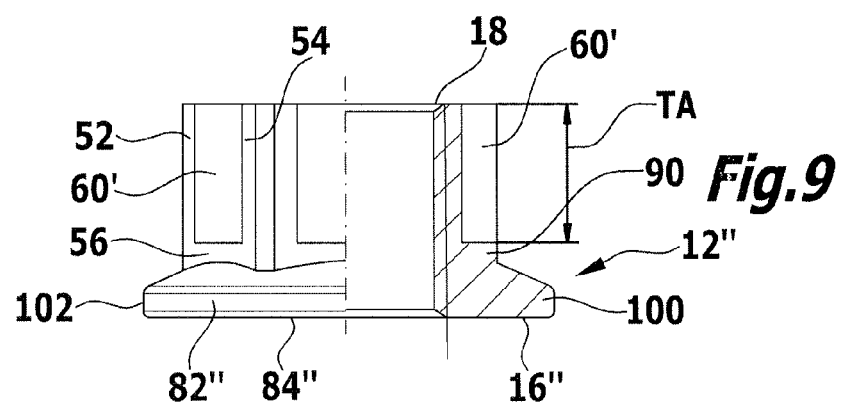
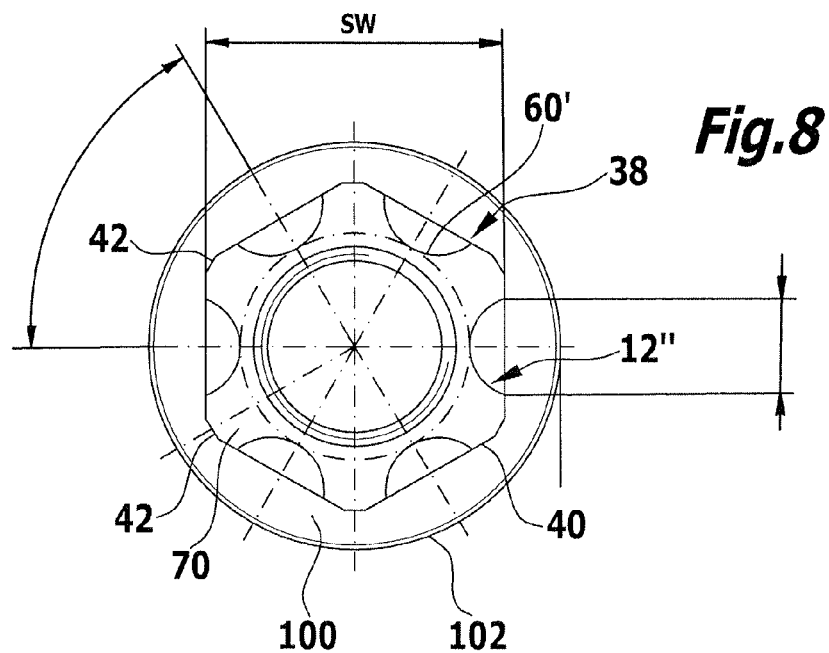

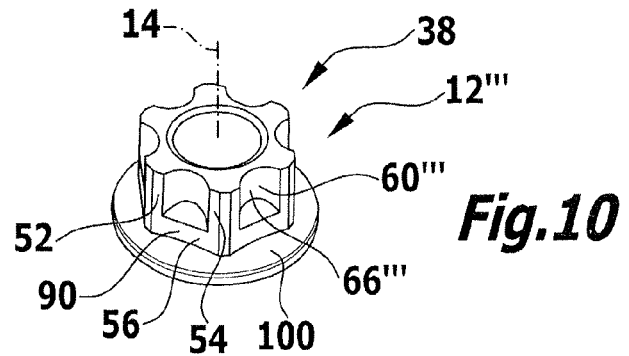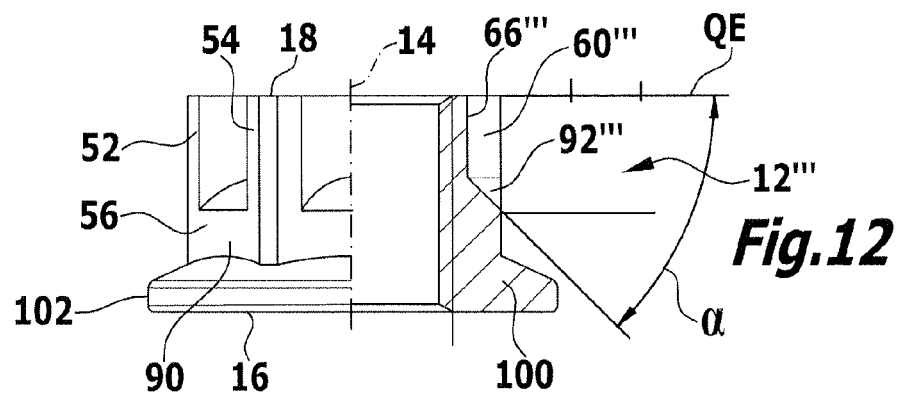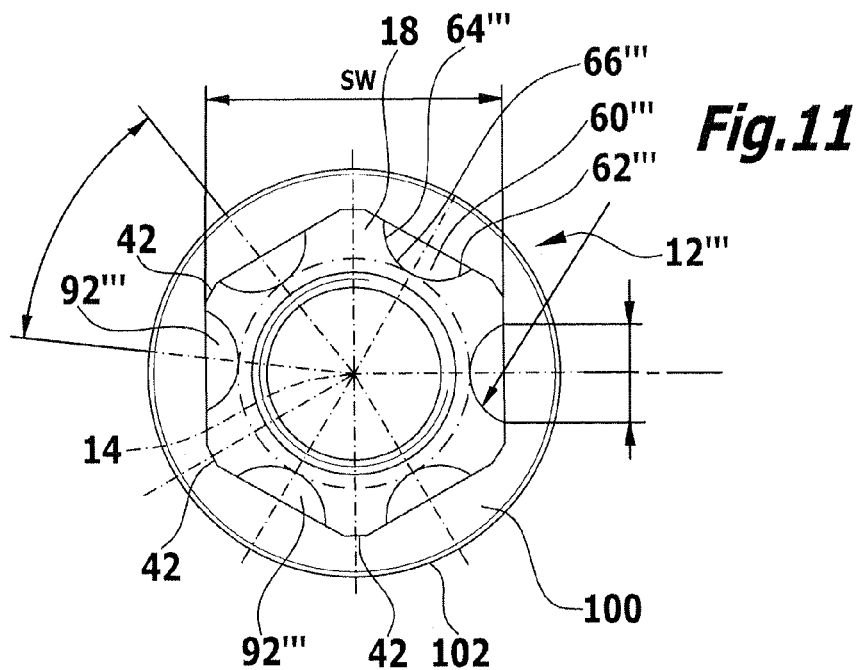

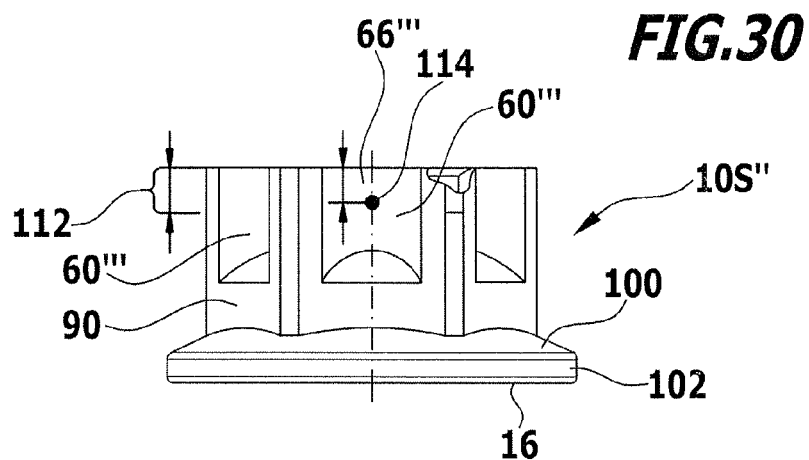
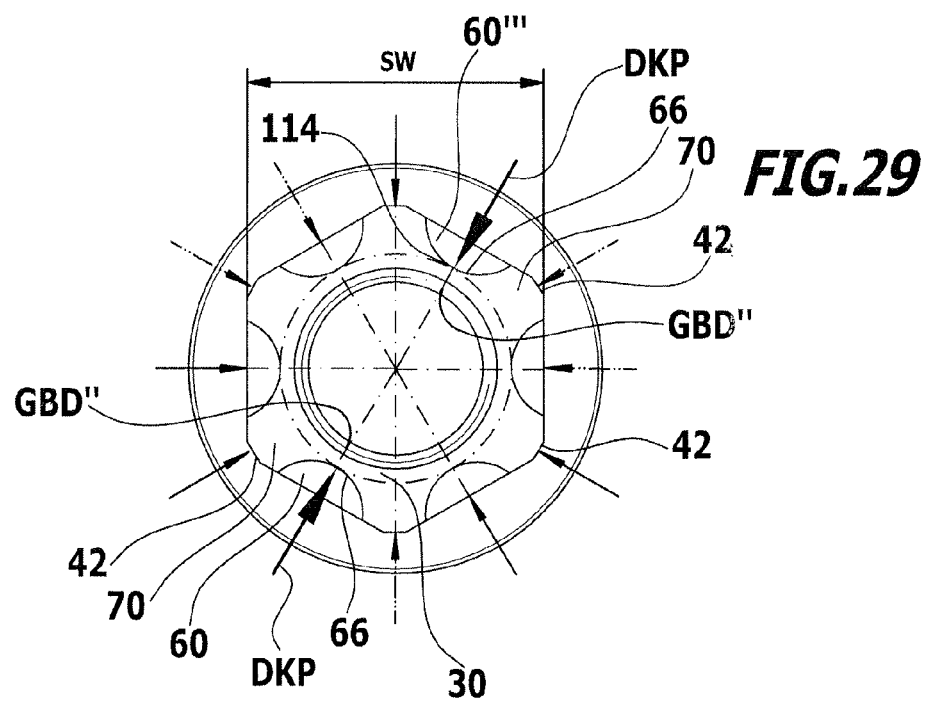

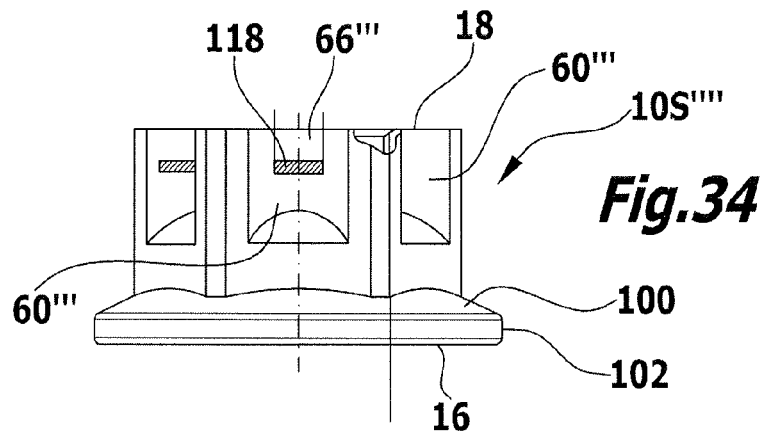
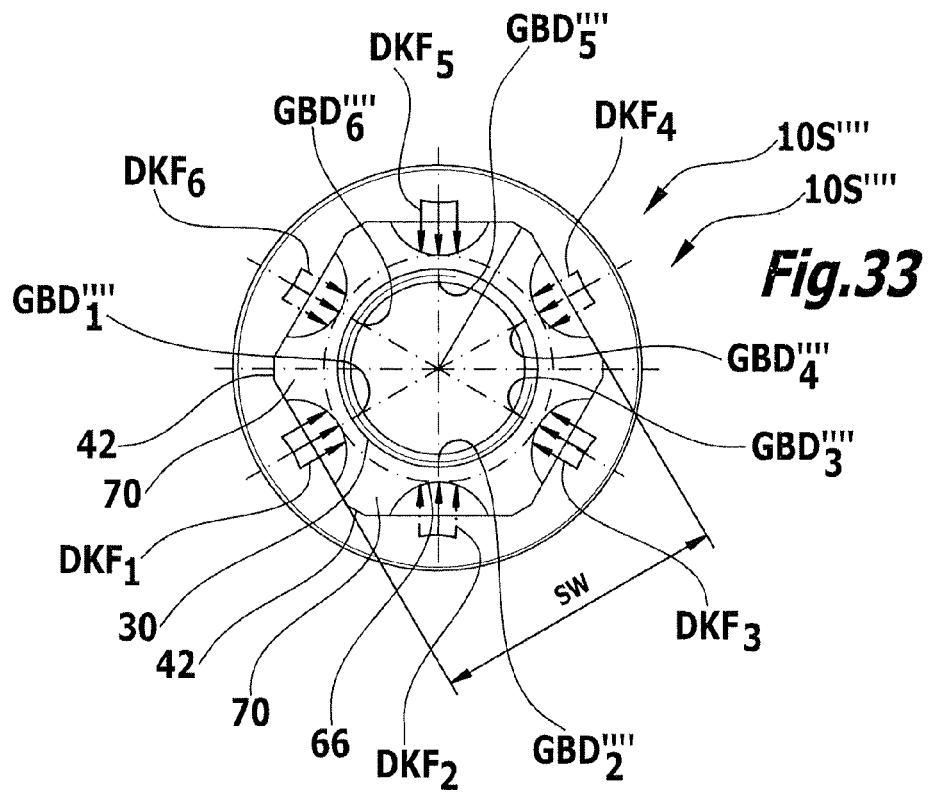

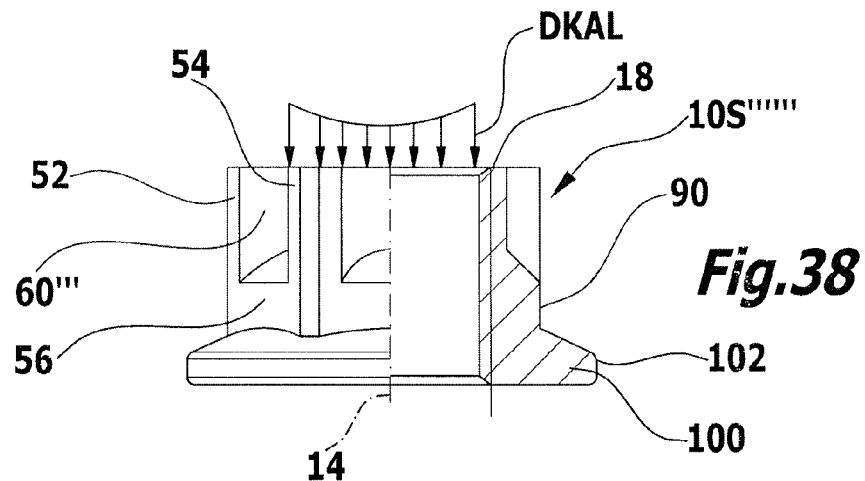
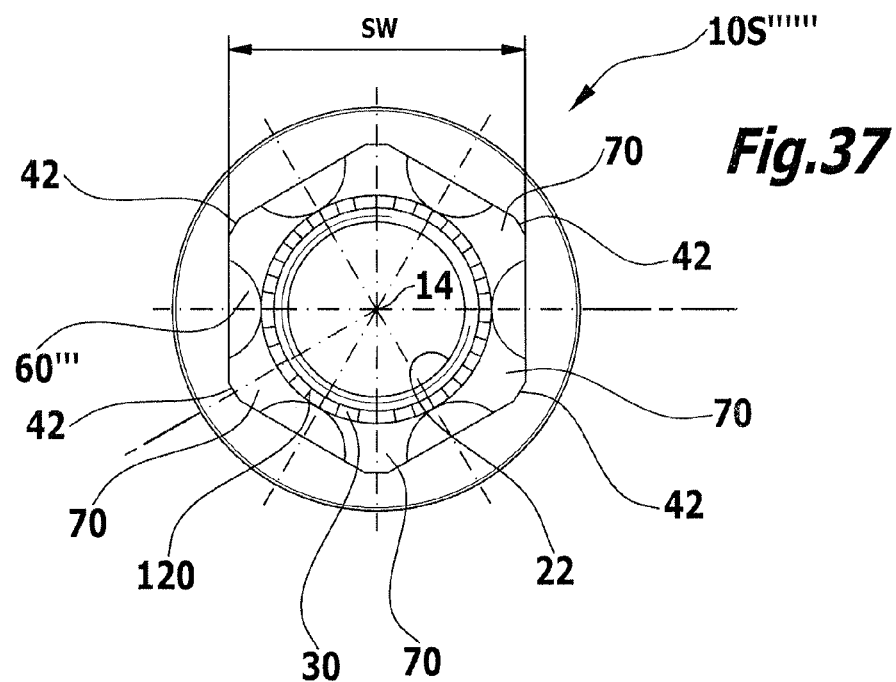

Table 1 Chemical Composition (Melt Analysis) of the AFP Steels according to Steel-Iron Material Specification 101

| Steel Type | | | | | | | |
|---|---|---|---|---|---|---|---|
| Abbr. Name | Material No. | C | Si | Mn | P | S | V |
| | | | | Mass proportion in % | | | |
| 49 MnVS 3 | 1.1199 | 0.44/0.50 | ≤ 0.50 | 0.70/1.00 | ≤ 0.035 | 0.030/0.065 | 0.08/0.13 |
| 38 MnSiVS 5 | 1.5231 | 0.35/0.40 | 0.50/0.80 | 1.20/1.50 | ≤ 0.035 | 0.030/0.065 | 0.08/0.13 |
| 27 MnSiVS 6 | 1.5232 | 0.25/0.30 | 0.50/0.80 | 1.30/1.60 | ≤ 0.035 | 0.030/0.050 | 0.08/0.13 |
| 44 MnSiVS 6 | 1.5233 | 0.42/0.47 | 0.50/0.80 | 1.30/1.60 | ≤ 0.035 | 0.020/0.035 | 0.10/0.15 |

Table 2 Mechanical Properties of the AFP Steels according to Steel-Iron Material Specification 101 (charact. values)

| Steel Type | | | State BY | | | | |
|---|---|---|---|---|---|---|---|
| Abbr. Name | Material No. | Diameter d or same area Cross Section mm | Yield Strength Re N/mm² min | Tensile Strength Rm N/mm² | Breaking Elongation A') % min | Reduction of Area Z') % min | Surface hardness after Induction hardening HRC min |
| 49 MnVS 3 | 1.1199 | 30 to 150 | 450 | 750 – 900 | 8 | 20 | 56 |
| 38 MnSiVS 5 | 1.5231 | 30 to 150 | 550 | 820 – 1000 | 12 | 25 | 52 |
| 27 MnSiVS 6 | 1.5232 | 30 to 150 | 500 | 800 – 950 | 14 | 30 | 48 |
| 44 MnSiVS 6 | 1.5233 | 30 to 150 | 600 | 950 – 1100 | 10 | 20 | 54 |

') Sample position: longitudinal samples (in fiber direction)

Fig. 39

| Material designation | : | 27 MnSiV 6 special 40 |
|---|---|---|
| Material number | : | 1.5232 |
| Melt | : | LD steel, place of mixing<br>Vacuum degassed |
| Type of casting | : | Continuous bloom casting, magnetically stirred |
| State of treatment | : | Cooled with roller control |
| Degree of purity | : | Micro degree of purity acc. to standard DIN 50602<br>Method K (oxides): K 3 max 40 |
| Grain size | : | Acc. to standard DIN 50601: 5 and finer |
| Structure | : | Ferritic-perlitic |
| Mechanical properties | : | Tensile test: Rm 750 – 900 N/mm² |

Chemical Composition of the Melt Analysis in % by weight

| Elements | C | SI | MN | P | S | CR | MO | NI | V | CU |
|---|---|---|---|---|---|---|---|---|---|---|
| min. | 0.28 | 0.55 | 1.40 |  | 0.015 | 0.10 |  |  | 0.08 |  |
| max. | 0.31 | 0.65 | 1.50 | 0.02 | 0.025 | 0.15 | 0.01 | 0.05 | 0.12 | 0.10 |

|  | SN | AL | N | TI |
|---|---|---|---|---|
| min. |  | 0.005 | 0.015 | 0.01 |
| max. | 0.015 | 0.025 | 0.02 | 0.02 |

Fig. 40

NUT WITH POLYGONAL SECTION

CROSS-REFERENCE TO RELATED PATENT APPLICATIONS

This patent application is a continuation of co-pending U.S. patent application Ser. No. 13/753,206, filed Jan. 29, 2013, which claims the benefit of German Application No. 102012100850.7, filed Feb. 1, 2012, the entire teachings and disclosure of which are incorporated herein by reference thereto.

BACKGROUND OF INVENTION

The invention relates to a nut, comprising a nut body which is provided or can be provided with an internal thread in the region of a bore and which has a polygonal section with a polygonal outer contour which has, on the one hand, edge areas and, on the other hand, key faces which are located between the edge areas and extend in key face planes which extend in a manner conforming to standards.

Nuts of this type are customary polygonal nuts which are known from the state of the art, wherein position and alignment and course of the key faces result, for example, from normative principles, for example, standards DIN EN 1661, 1663, 1664, 1667, standards DIN EN ISO 4032-4036, standards DIN EN ISO 8673-8675, standards DIN EN ISO 7040-7042, standard DIN EN ISO 7719, standards DIN EN ISO 10511-10513 as well as standard DIN EN ISO 4759-1.

The nuts can already be provided with an internal thread or be provided only with a bore, in which an internal thread results when self-forming or self-tapping screws are screwed in.

With screws of this type there is the need to reduce the weight of them, with mechanical properties of use which are as advantageous as possible.

The object underlying the invention is, therefore, to optimize a nut of the generic type in such a manner that it has mechanical properties which are as ideal as possible with as low a weight as possible.

SUMMARY OF THE INVENTION

This object is accomplished in accordance with the invention, for a nut of the type described at the outset, in that the nut body has a plurality of recesses which extend into the nut body in the direction of the bore proceeding from the respective key face planes.

The advantage of the solution according to the invention is to be seen in the fact that material can be saved and, therefore, weight reduced as a result of the recesses extending into the nut body without the mechanical properties of the nut body being negatively impaired.

With respect to the arrangement of the recesses no further details have been given.

One advantageous solution provides for recesses to extend into the nut body each proceeding from key face planes which are located opposite one another.

In the simplest case, there would be two key face planes which are located opposite one another and proceeding from which recesses extend into the nut body.

However, there can be several key face planes, proceeding from which recesses extend into the nut body.

The saving on weight is, however, even more advantageous when a recess extends into the nut body proceeding from each key face plane of the polygonal section.

With respect to the extension of the recess into the nut body, no further details have been given in conjunction with the embodiments described thus far.

One advantageous solution provides for the recess to extend from the respective key face plane as far as a thread-bearing casing surrounding the internal thread in a stabilizing manner, i.e. for the recess to extend only as far as the thread-bearing casing but not beyond it.

The thread-bearing casing is an area of the nut body which is closed in circumferential direction, surrounds the internal thread in a stabilizing manner and sees to it that the internal thread will not be deformed, in particular widened, beyond a defined amount during stressing as a result of a threaded bolt being screwed into it or a screw screwed into it and, therefore, lose the shape or shape stability it requires for absorbing force and/or torque.

In this respect, it is particularly advantageous when the thread-bearing casing has, proceeding from an external diameter of the internal thread, a radial minimum thickness which is at least 0.05 times the external diameter of the internal thread.

In this respect, a radial minimum thickness is measured at the point of the thread-bearing casing which is the thinnest in a radial direction, is, in particular, an integral part of the nut body and has the radial minimum thickness at every point and so the stability of the thread-bearing casing is determined by the radial minimum thickness.

The radial minimum thickness of the thread-bearing casing can be invariable in the direction of the central axis.

It is, however, also conceivable for the radial minimum thickness of the thread-bearing casing to be variable in the direction of the central axis.

In principle, it is conceivable with the solution according to the invention to design the nut body in such a manner that it extends between a first end face and a second end face and each of the end faces is suitable for the purpose of acting on a body or an element for fixing the same in place by means of the nut.

However, in order to be able to optimize the nut according to the invention with respect to the introduction of force into the nut body, it is preferably provided for the nut body to have a first end face designed as a pressure side with a pressure surface and a second end face facing away from the pressure side, between which the nut body extends.

This solution has the advantage that the nut may, as a result, be optimized to the extent that in the region of the pressure side the forces occurring when a body or an element is acted upon with the nut act on the nut body and will be absorbed by it whereas in the case of the second end face it is assumed that this experiences no direct action by a force.

In the case of such a nut, it is provided, for example, for the recess to extend as far as the second end face since it is not to be expected that the nut body will be acted upon with a force in the region of the second end face and so the forces occurring in the region of the second end face are the smallest.

Furthermore, it is possible to design the nut body such that the recess extends as far as the pressure side, wherein, in this case, the stability of the shape of the pressure side needs to be adequate enough for it to absorb the loads envisaged.

In a further embodiment, it is provided for the recess to extend only over a partial section of the extension of the nut body from the one end face as far as the other end face and so the recess does not reach the other end face.

Another advantageous solution provides for the recess to extend as far as a pressure base provided on the pressure side and, therefore, to end at the pressure base and so the nut body experiences an additional stability in the region of the pressure side as a result of the pressure base.

Alternatively or in addition hereto, it is, however, also provided for the recess to extend as far as a pressure flange which is provided on the pressure side and extends radially beyond the polygonal section.

With respect to the minimum thickness of the thread-bearing casing it is also advantageous with the presence of a pressure side of the nut body when the radial minimum thickness of the thread-bearing casing in the region of the pressure side is at least as great as in the region of the second end face.

It is even more advantageous when the radial minimum thickness of the thread-bearing casing in the region of the pressure side is greater than in the region of the second end face since greater circumferential loads on the thread-bearing casing result in the region of the pressure side, due to the force interaction between pressure side and thread, than in the region of the second end face and so, as a result, the nut body can be optimized with a view to the loads which occur.

It is particularly favorable when the thread-bearing casing has an increasing minimum thickness with increasing extension from the second end face towards the pressure side since, as a result, the circumferential loads on the thread-bearing casing, which increase proceeding from the second end face, can be taken into consideration in an optimum manner as a result of the force interaction between pressure side and internal thread.

With respect to the design of the key faces, no further details have so far been given.

One advantageous solution, for example, provides for key face areas, which adjoin oppositely located edge areas and between which the respective recess is located, to be located in every key face plane.

This means that the respective recess divides at least two key face areas which each extend adjacent to the edge areas and are separated from one another at least partially by the recess and together form the key face.

With respect to the minimum extension of the key face areas in a transverse direction between the edge areas, wherein the transverse direction extends parallel to a distance direction of the edge areas, it is preferably provided for the sum of the extension of the key face areas in a transverse direction between two respective edge areas which follow one another to be at least 10%, even better at least 15%, in particular at least 20%, of a distance between these edge areas in the transverse direction in every cross sectional plane through the polygonal section which extends at right angles to a central axis of the internal thread.

This means that the key face formed from the two key face areas has been reduced to ten percent of the extension in the transverse direction, in relation to the extension of the key face when no recess is present.

In principle, it is conceivable to select the extension of the respective individual key face areas to be different, wherein the sum of the extensions is 10% of the distance between the edge areas.

This would be conceivable, for example, when an optimized adjustment of the key face areas to the loads on the nut body during tightening or releasing is intended to take place.

For example, it is conceivable in the case of a nut body which is primarily intended to be screwed tight and, as a rule, to no longer be subsequently released to select the two key face areas to be different, for example to design the key face area, which is loaded to a greater degree when the nut body is screwed tight, to be broader in the transverse direction than the key face area which is loaded to a lesser degree.

A simplified embodiment provides for both key face areas to have approximately the same extension in the transverse direction, preferably the same extension in the transverse direction.

With respect to the design of the recesses themselves, no further details have so far been given.

The recesses could have any optional shapes with respect to their extension parallel and radially to the central axis, i.e. have free formed surfaces.

Furthermore, each of the recesses of the nut body can differ from the other recesses in its form and or extension.

For example, recesses respectively arranged on oppositely located sides of the nut body are, however, of the same design.

Nothing has been mentioned, in particular, concerning the cross-sectional shape of the recesses.

One advantageous solution, for example, provides for the recesses to have the same cross-sectional shape in a cross-sectional plane extending through the polygonal section each time at right angles to a central axis of the internal thread.

It is conceivable, for example, for the cross-sectional shape of the recesses to be similar to a U in the respective cross-sectional plane.

It is, however, also conceivable for the cross-sectional shape of the recesses in the respective cross-sectional plane to approximate a cross-sectional shape similar to a circular segment or a rectangular or V-shaped cross-sectional shape.

One advantageous solution provides for the recesses to have a cross-sectional shape which is determined by a base area and side wall areas which adjoin the base area and extend transversely to the respective key face plane.

In this respect, it is conceivable, for example, for the recesses to be designed such that they have a cross-sectional shape which is determined by a base area which is curved concavely and connects the side wall areas.

With respect to the variation in the cross-sectional shape of the recess, no further details have so far been given.

It is provided, for example, for the recess to have a cross-sectional shape which is constant or varying with its extension in a direction parallel to the central axis.

For example, it is conceivable, in particular, for a distance of the base area from a central axis of the internal thread to be essentially constant over the extension of the recess in the direction of the central axis.

Alternatively thereto, it is, however, also conceivable for the base area to be at a varying distance from the central axis with its extension in the direction of the central axis.

For example, it is provided for the recess to be provided with a base area which extends at an angle to the central axis and extends, for example, as far as the respective key face plane.

Alternatively or in addition to the features of the solution according to the invention which are described above, the object specified at the outset is also accomplished in accordance with the invention by a nut of the type described at the outset in that, in order to design the nut as a check nut, the internal thread is produced as an internal thread corresponding to a standard course but is designed to deviate from the standard course as a result of plastic deformation of the nut body.

The advantage of the solution according to the invention is to be seen in the fact that it is possible simply as a result of plastic deformation of the nut body to produce a check nut which has, therefore, optimum mechanical properties with as low a weight as possible since no additional elements are provided on the nut body which are normally required for achieving the clamping torque necessary for a check nut.

As a result, the nut according to the invention likewise has improved or optimized mechanical properties with as low a weight as possible.

The defined clamping torque required for the function according to the invention as a check nut may be achieved, in particular, in that the internal thread has, on account of the deformation of the nut body, varying radial distances from the central axis which deviate from a standard course and/or distance courses or thread pitches which deviate from a standard course and so any screwing in of a threaded bolt or a screw deforms the plastically deformed nut body again elastoplastically towards the standard measurements, whereby the clamping torque results.

In the simplest case, it is provided for the internal thread to be of a non-circular design with respect to the central axis on account of the plastic deformation of the nut body.

Another advantageous solution provides for the internal thread to have deformed thread areas which are arranged at equal angular distances with respect to the central axis and the distance of which from the central axis is reduced in terms of a standard course, i.e. their distance is less than in the case of a design conforming to standards.

In the simplest case, this is a pair of deformed thread areas located opposite one another, the distance of which from the central axis is reduced.

In a further, advantageous embodiment, the defined clamping torque required for the check nut according to the invention may be expediently brought about in that the internal thread has a plurality of deformed thread areas which are arranged with twofold or multiple symmetry with respect to the central axis and the distance between which is reduced in terms of a standard course.

For example, several deformed thread areas are provided which are located opposite one another in pairs with respect to the central axis and the distance between which is reduced in comparison with the standard measurement or, for example, three or more deformed thread areas are provided which are distributed evenly on the circumference and the distance between which is reduced in terms of a standard course.

One particularly expedient design of the nut according to the invention provides for the nut body to be plastically deformed as a result of a force acting on edge areas which are located opposite one another with respect to the central axis.

Alternatively thereto, another solution provides for the nut body to be plastically deformed as a result of a force acting on base areas and/or side wall areas of recesses which are located opposite one another with respect to the central axis.

In this respect, it is particularly favorable when the force acts in an upper region of the polygonal section since the nut body can preferably be plastically deformed in the upper region with smaller forces than in the region of a pressure side thereof.

A further, alternative solution provides for the nut body to be plastically deformed as a result of a force acting in the region of an outer edge of the second end face.

One solution provides, in particular, for the internal thread to have deformed thread areas with a course which deviates from a standard course, wherein, for example, the course of its pitch is altered in terms of a standard pitch, i.e., for example, a distance of the thread turns from one another is greater or smaller than in the case of a design conforming to standards.

On the other hand, a further, advantageous solution provides for the nut body to be plastically deformed as a result of a force acting on one of the end faces, in particular the second end face, with a component in the direction parallel to the central axis.

In the cases, in which a force acts on an outer edge of the second end face or a force acts directly on the second end face, a thread turn directly adjoining the second end face will be plastically deformed in a manner deviating from a standard course in order to bring about the required clamping torque.

With respect to the type of action of the deformation forces, no further details have so far been given.

One advantageous solution, for example, provides for the nut body to be plastically deformed by deformation forces acting punctiformly.

Alternatively or in addition thereto, a further solution provides for the nut body to be plastically deformed by deformation forces acting linearly.

Alternatively or in addition, a further, expedient solution provides for the nut body to be plastically deformed by deformation forces acting areally.

With respect to the extent of the deformation of the nut body, no further details have so far been given.

One advantageous solution, for example, provides for the nut body to be deformed primarily globally.

The term globally deformed is to be understood such that the nut body, preferably the polygonal section of the nut body, has overall a shape which deviates from the standard courses relative to a shape produced so as to conform to standards.

This means that the nut body and, in particular, the polygonal section thereof are deformed as a whole.

Alternatively or in addition, it is, however, also likewise possible for the nut body to be deformed primarily locally.

A primarily local deformation is to be understood such that this has an effect only locally, i.e. in the area of the nut body, in which it is introduced, and, therefore, does not have the effect that the nut body itself or the polygonal section thereof significantly alter their basic shape.

With respect to the material, from which the nut body has been produced, no further details have been given in conjunction with the preceding comments on the solutions according to the invention.

A nut with at least one of the features explained above can be produced from metal, for example steel, ceramics, glass, a polymer, a compound or a "smart material".

In particular, the object specified at the outset is also accomplished in accordance with the invention, alternatively or in addition to the features of the embodiments and versions described thus far, in that the nut body is produced from steel with a bainitic or ferritic-perlitic structure.

A steel with such a structure enables the nut to be given mechanical properties which are as ideal as possible with as low a weight as possible and, in particular, such a structure allows a particularly inexpensive production of such a nut.

One expedient solution, for example, provides for the bainitic or ferritic-perlitic structure to have a carbon content of 0.25% by weight or more.

Such a carbon content has proven to be expedient for a structure of a nut with optimum mechanical properties.

The stability properties of such a bainitic or ferritic-perlitic structure may be enhanced in accordance with the invention in that the bainitic or ferritic-perlitic structure has strength properties enhanced by precipitations of microalloy elements.

In this respect, the amounts of such microalloy elements are very small.

One advantageous solution provides, for example, for the bainitic or ferritic-perlitic structure to have at least 0.05% by weight of microalloy elements.

One particularly expedient solution provides for the bainitic or ferritic-perlitic structure to have at least 0.1% by weight of microalloy elements.

In this connection, no further details have been given concerning such microalloy elements.

Microalloy elements of this type are, for example, Nb, Va, Ti.

Another advantageous solution provides for the bainitic or ferritic-perlitic structure to have strength properties enhanced as a result of a thermo-mechanical pretreatment.

These are thermo-mechanical pretreatment steps which are known from the state of the art.

In addition, one advantageous solution provides for the bainitic or ferritic-perlitic structure to have a solid solution hardening as a result of, for example, silicon and/or manganese.

Furthermore, it is possible to bring about the desired shape stability of the nut body, in particular in the region of the thread-bearing casing, by means of a subsequent heat treatment.

It is, however, particular advantageous when the desired shape stability of the thread-bearing casing can be achieved as a result of cold forming of bainitic or ferritic-perlitic structures and generation in sections of high dislocation densities without any subsequent heat treatment since this method makes considerable savings in the production costs possible.

One expedient embodiment of a nut provides for the bainitic or ferritic-perlitic structure to have, as a result of controlling the structure transformation and as a result of reshaping, a hardness in the range of 100 to 370 HV, even better 110 to 360 HV, for regular threads and a hardness in the range of 170 to 370 HV, even better 180 to 360 HV, for fine threads in the thread-bearing casing without any subsequent thermal treatment being necessary. otherwise clearly contradicted by context. In addition, the object specified at the outset is also accomplished by a method as defined in any one of claims 48 to 70.

In addition, the object specified at the outset is also accomplished by a method as defined in any one of claims 48 to 70.

Additional features and advantages are the subject matter of the following description as well as the drawings illustrating several embodiments.

BRIEF DESCRIPTION OF THE DRAWINGS

FIG. 3 shows a section along line 3-3 in FIG. 2;

FIG. 7 shows an illustration similar to FIG. 1 of a third embodiment of the nut according to the invention;

FIG. 8 shows an illustration similar to FIG. 2 of the third embodiment of the nut according to the invention;

FIG. 9 shows an illustration similar to FIG. 3 of the third embodiment of the nut according to the invention;

FIG. 10 shows an illustration similar to FIG. 1 of a fourth embodiment of the nut according to the invention;

FIG. 11 shows an illustration similar to FIG. 2 of the fourth embodiment of the nut according to the invention;

FIG. 12 shows an illustration similar to FIG. 3 of the fourth embodiment of the nut according to the invention;

FIG. 29 shows an illustration similar to FIG. 25 of a third version of a check nut according to the invention;

FIG. 30 shows an illustration similar to FIG. 26 of the third version of a check nut according to the invention;

FIG. 33 shows an illustration similar to FIG. 25 of a fifth version of a check nut according to the invention;

FIG. 34 shows an illustration similar to FIG. 26 of the fifth version of the check nut according to the invention;

FIG. 37 shows an illustration similar to FIG. 25 of a seventh version of the check nut according to the invention and FIG. 38 shows an illustration similar to FIG. 26 of the seventh version of the check nut according to the invention;

FIG. 39 shows a summary of steels with a precipitation-hardening, ferritic-perlitic structure according to the invention and FIG. 40 shows a summary of properties and compositions of a steel consisting of a precipitation-hardening, ferritic-perlitic structure according to the invention with good cold forming properties.

DETAILED DESCRIPTION OF THE DRAWINGS

Figure 1:
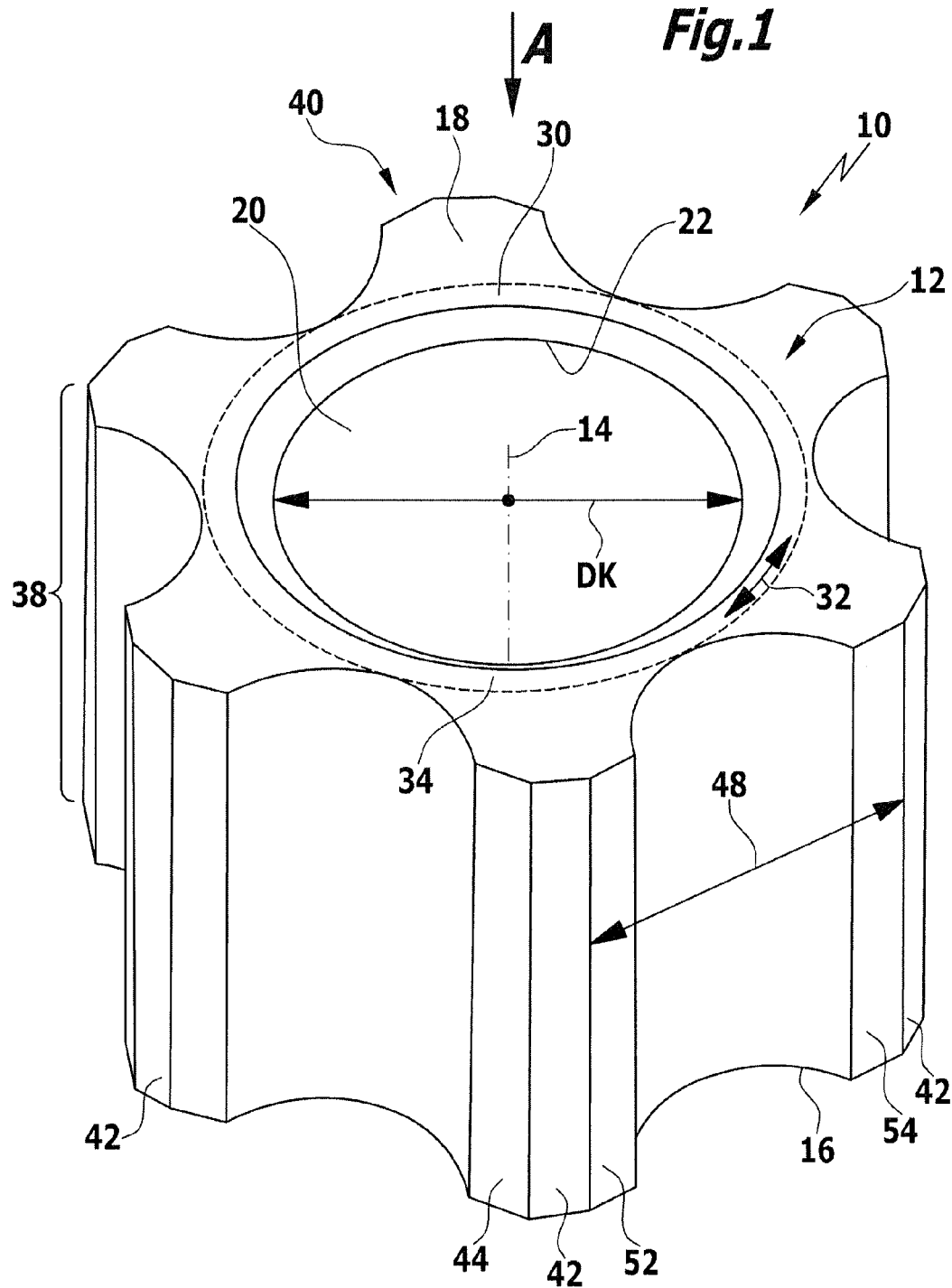
FIG. 1 shows a perspective illustration of a first embodiment of a nut according to the invention.
Figure 2:
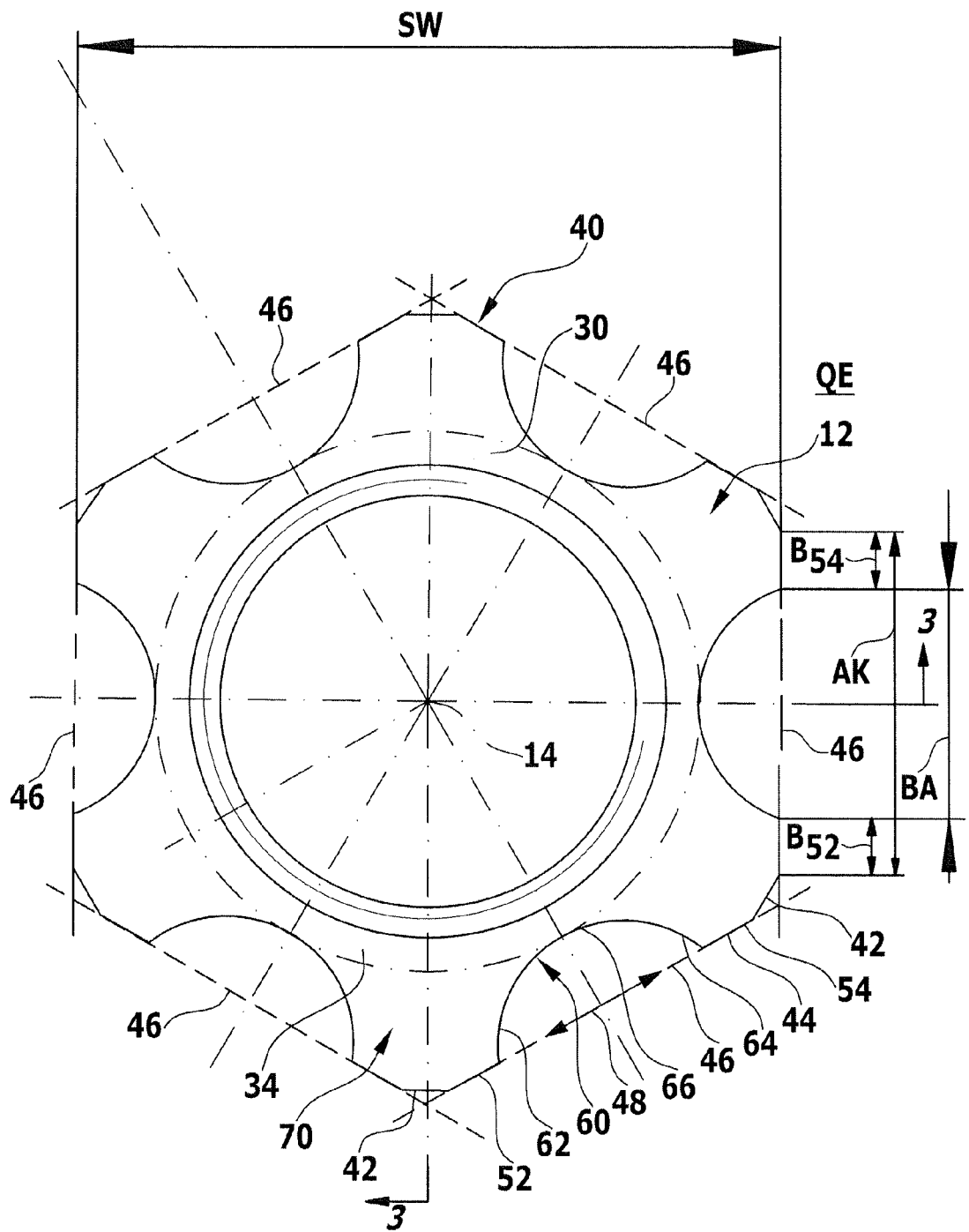
FIG. 2 shows a plan view of the nut in the direction of arrow A in FIG. 1.

A first embodiment of a nut according to the invention, which is illustrated in FIGS. 1 to 3 and designated as a whole as 10, comprises a nut body 12 which extends along a central axis 14 between a first end face 16 and a second end face 18.

The nut body 12 is penetrated by a threaded bore 20 which extends parallel to the central axis 14 from the first end face 16 as far as the second end face 18 and has an internal thread 22 with thread turns 24 which extend into the nut body 12 from a core hole diameter DK predetermined by an internal contour of the thread turns 24 as far as a nominal diameter or external diameter DA predetermined by an outer contour of the thread turns 24 and which are borne by a thread-bearing casing 30 which surrounds the thread turns 24 and is part of the nut body 12.

The cylindrical thread-bearing casing 30, which represents an integral component of the nut body 12, conveys to the thread turns 24 the necessary stability against any deviation thereof in a radial and/or in an axial direction relative to the central axis 14 as a result of its wall 34 which is closed in a circumferential direction 32 extending around the central axis 14, wherein the wall 34 of the thread-bearing casing 30 has, proceeding from the external diameter DA in a radial direction in relation to the central axis 14, a thickness DG which corresponds at least to 0.05 times the external diameter DA of the internal thread 22 in order to stabilize the thread turns 24 against any movement in a radial and/or axial direction relative to the central axis 14 during any load resulting from a threaded bolt 36 being screwed into the thread turns 24 with a corresponding external thread 35.

The nut body 12 is provided in a polygonal section 38, which extends in the first embodiment from the first end face 16 as far as the second end face 18, with a polygonal outer contour 40 which is defined by edge areas 42 and key faces 44 located between the edge areas 42, wherein key faces 44 which are located opposite one another with respect to the central axis 14 extend parallel to one another and at a distance which is defined by a standard customary for the nut 10, for example standards DIN EN 1661, 1663, 1664, 1667, standards DIN EN ISO 4032-4036, standards DIN EN ISO 8673-8675, standards DIN EN ISO 7040-7042, standard DIN EN ISO 7719, standards DIN EN ISO 10511-10513 as well as standard DIN EN ISO 4759-1 and so the outer contour 40 has each time an even number of key faces 44 which extend parallel to one another in pairs, wherein the edge areas 42 each represent a transition between key faces 44 which follow one another in circumferential direction 32.

In the case of the nut 10 illustrated, the polygonal outer contour 40 is designed as a hexagon with a cross-sectional shape of a regular hexagon in accordance with "Tabellenbuch Metall" (=Table Book Metal), 44th edition, publisher Europa Lehrmittel, page 59 and so six edge areas 42 and six key faces 44 are located in the key face planes 46 between the edge areas 42 respectively following one another, wherein the key face planes 46 each extend parallel to the central axis 14 and are aligned such that key face planes 46 located respectively opposite one another extend parallel to the central axis 14 located between them and parallel to one another.

In the case of the nut body 12 of the first embodiment according to the invention, the key faces 44 do not extend, in a transverse direction 48 located in the respective key face plane 46 between the edge areas 42 which follow one another, in a coherent and interconnected manner in the key face planes 46 but rather the key faces 44 are formed by key face areas 52 and 54 which are located in the key face planes 46, wherein the key face areas 52 and 54 each preferably adjoin one of the edge areas 42 and extend in the direction of the respectively other edge area 42 but do not merge into one another.

On the contrary, a recess 60 is located between the key face areas 52 and 54 and this recess extends into the nut body 12 in the direction of the central axis 14 proceeding from the respective key face plane 46 and has side wall areas 62 and 64 which adjoin the key face areas 52 and 54 and extend transversely to them as well as a base area 66 which connects the side wall areas 62 and 64 and is designed to be concavely curved and project into the nut body to such an extent that it touches the thread-bearing casing 30.

The base area 66 is preferably curved concavely in such a manner that it merges into the side wall areas 62 and 64 which are likewise curved concavely and so the recess 60 has a U-shaped cross-sectional shape, preferably even a cross-sectional shape approximating an arc segment, in a cross-sectional plane QE which extends at right angles to the central axis and corresponding to the intermediate plane in FIG. 2.

In the case of the nut body 12 according to the invention, the edge areas 42, the key face areas 52 and 54 as well as the side wall areas 62 and 64 and, in part, the base area 66 are borne by outer contour supports 70 of the nut body 12 which likewise represent an integral component of the nut body 12 and, therefore, are also integrally formed in one piece on the thread-bearing casing 30 and each extend outwards radially to the central axis 14 proceeding from the thread-bearing casing 30 and bear the faces previously mentioned.

Proceeding from the edge areas 42, the key face areas 52 and 54 forming the key face 44 extend in the respective cross-sectional plane QE, which runs at right angles to the central axis 14, for example the plane of drawing in FIG. 2, over a width B52 and a width B54 in a transverse direction 48 which together add up to at least 10% of a distance AK between adjacent edge areas 42 and so, vice versa, the recess 60 has a width BA in the cross-sectional plane QE extending at right angles to the central axis 14 which is at the most 90% of the distance AK between the edge areas 42 following one another.

The outer contour 40 which is defined only by the key face areas 52 and 54 as well as the edge areas 42 and is designed in these areas to conform to standards is, in the first embodiment, identical in each cross-sectional plane QE extending at right angles to the central axis 14 in the region of the polygonal section 38 of the nut body 12 and so customary tools provided for such a polygon which conform to standards can engage the polygonal section 38 with the respective key width SW in order to be able to screw the nut 10 with the internal thread 22 onto a threaded bolt and screw it tight.

In the embodiment of a nut 10 according to the invention illustrated in FIG. 1, the nut body 12 does not extend beyond the polygonal section 38, i.e. the nut body 12 is formed merely by the polygonal section 38 and so, for example, the end face 16 represents a pressure surface 82, with which an element to be screwed tight or a body to be screwed tight is to be acted upon.

Furthermore, the cross-sectional shape of the nut body 12 is identical in each cross-sectional plane QE extending at right angles to the central axis 14 in the entire polygonal section 38 and so it has the identical cross-sectional shape over the entire extension of the nut body between the first end face 16 and the second end face 18.

As a result, the nut body 12 of the first embodiment is designed altogether such that it has a sixfold rotational symmetry about the central axis 14 except for the course of the internal thread 22.

If an element is acted upon with a pressure surface 84 from the pressure side 82, the forces acting in circumferential direction 32 in the thread-bearing casing 30 close to the pressure side 82, which act in the sense of a widening of the thread-bearing casing 30, are at a maximum and decrease with increasing distance from the pressure side 82 and so the thread-bearing casing 30 is to be dimensioned altogether such that the radial thickness DG of its wall 34 is sufficient to absorb the collective load of forces and torque during the designated load on the nut body 12 adjoining the pressure side 82 (FIG. 3).

Figure 4:
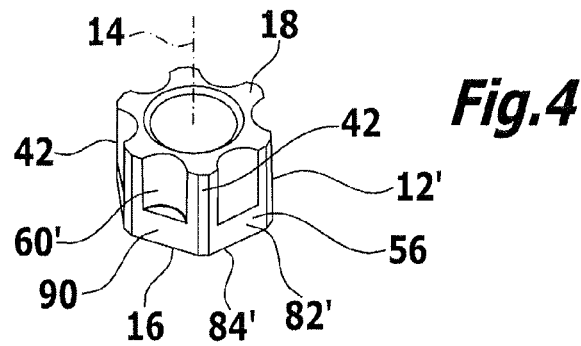
FIG. 4 shows an illustration similar to FIG. 1 of a second embodiment of a nut according to the invention.
Figure 6:
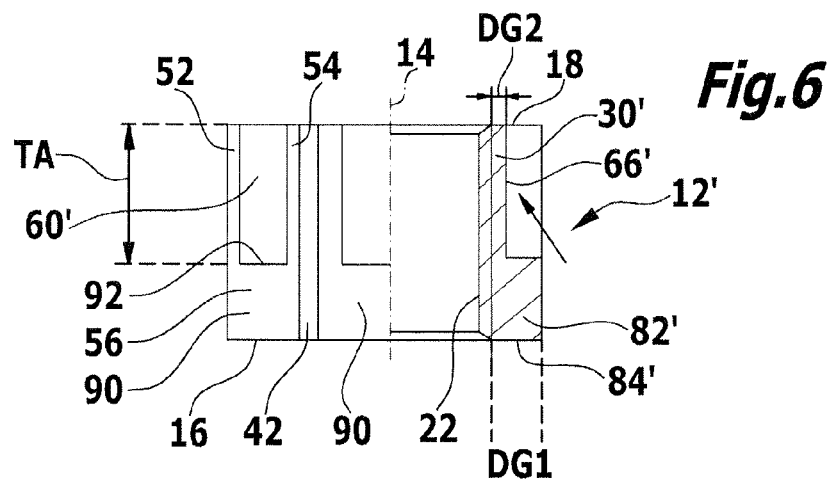
FIG. 6 shows an illustration similar to FIG. 3 of the second embodiment of the nut according to the invention.
Figure 5:
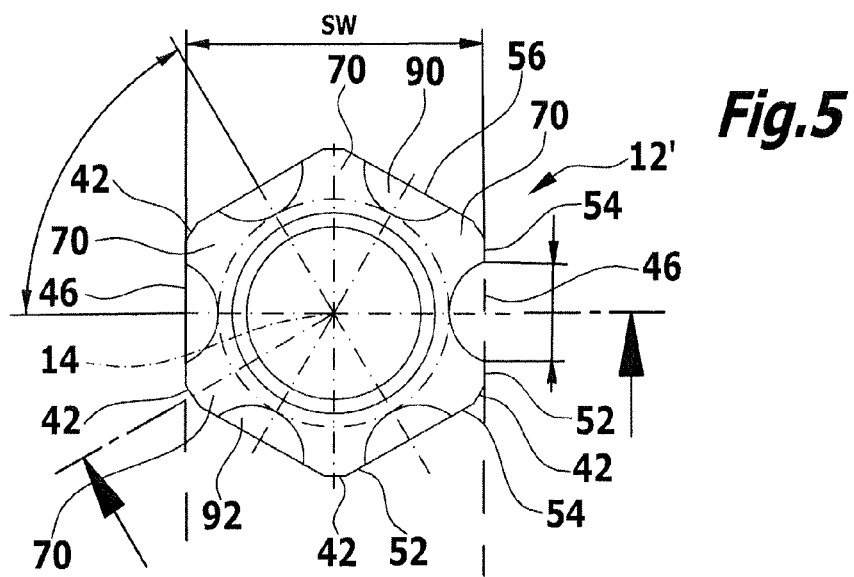
FIG. 5 shows an illustration similar to FIG. 2 of the second embodiment of the nut according to the invention.

In a second embodiment, illustrated in FIGS. 4 to 6, the polygonal section 38 likewise extends over the entire nut body 12' from the first end face 16 to the second end face 18 along the central axis 14 but the recess 60' does not extend from the second end face 18 as far as the first end face 16' but as far as a pressure base 90 in the region of the pressure side 82' which represents an integral component of the nut body 12' and extends between consecutive edge areas 42 radially to the central axis 14 as far as the key face planes 46 and so in the region of the pressure base 90 a key face area 56 is formed which extends in the transverse direction 46 continuously between the edge areas 42.

In the second embodiment, the recess 60' therefore extends from the second end face 18 in the direction of the first end face 16 only as far as the pressure base 90 and, therefore, over a partial section TA of the extension of the nut body 12' in the direction of the central axis 14 and terminates with an end wall 92 which is aligned parallel to a cross-sectional plane QE extending at right angles to the central axis 14 and represents an upper side of the pressure base 90 located opposite a pressure surface 84'.

As a result of the fact that the pressure base 90 of the second embodiment extends radially further outwards in the region of the pressure side 82', the radial thickness DG 1 of the thread-bearing casing 30 is greater in the region of the first end face 16 than in the region of the second end face, in which the radial thickness DG 2 of the thread-bearing casing 30 is limited by the base area 66' of the recess 60'.

As a result, the thread-bearing casing 30' has a greater radial thickness DG1 in the region of the pressure side 82' and therefore gives the internal thread 22, in the region of the pressure side 82', a greater stability against any radial and/or axial widening thereof.

An additional reinforcement of the thread-bearing casing 30 against any widening in the circumferential direction 32 is therefore brought about in the region of the pressure side 82' as a result of the pressure base 90.

In addition, a reinforcement of the outer contour supports 70 relative to one another is brought about as a result of the pressure base 90 and so, as a result, the nut body 12' is altogether able to absorb greater loads.

In a third embodiment, illustrated in FIGS. 7 to 9, those parts which are identical to those of the first embodiment are likewise given the same reference numerals and so reference can be made in full to the comments on the preceding embodiments.

In contrast to the second embodiment, a pressure flange 100 is provided in the third embodiment in the region of the pressure base 90 and this pressure flange projects radially beyond the polygonal body 38 and has a circular outer contour 102 in relation to the central axis 14 and so in the region of the pressure side 82" of the nut body a pressure surface 84" increased in size is present and this projects radially beyond a cross-sectional surface of the polygonal section 38 which, in this embodiment, rises above the pressure flange 100 in the direction parallel to the central axis 14. The polygonal section 38 is designed in the same way as in the second embodiment since the recess 60' extends in the direction of the first end face 16" proceeding from the second end face 18 only as far as the pressure base 90, as in the second embodiment, and terminates with an end wall 92 in the region of the pressure base 90.

In this respect, the end wall 92 extends, in the same way as that described in the second embodiment, parallel to the cross-sectional planes QE extending at right angles to the central axis 14.

In a fourth embodiment, illustrated in FIGS. 10, 11 and 12, the nut body 12''' is, insofar as the same reference numerals are used, of an identical design to the preceding embodiments and so reference can be made in full to the comments on them.

The nut body 12''' comprises, in particular, the polygonal section 38, with the pressure base 90 and the pressure flange 100 according to the third embodiment.

In contrast to the third embodiment, the end wall 92''' of the recess 60''' does not, however, run parallel to a cross-sectional plane QE but rather at an angle α to it and is, therefore, inclined outwards in relation to the central axis 14 with increasing radial extension proceeding from the base area 66''' of the recess 60''' and so the end wall 92''' drops radially outwards towards the pressure flange 100.

Figure 13:
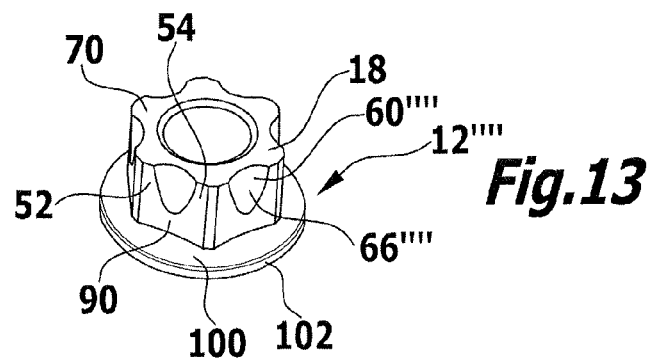
FIG. 13 shows an illustration similar to FIG. 1 of a fifth embodiment of the nut according to the invention.
Figure 15:
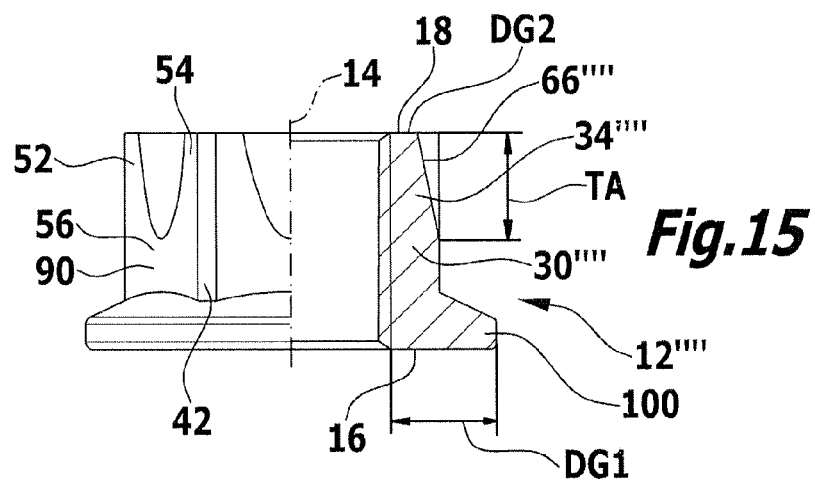
FIG. 15 shows an illustration similar to FIG. 3 of the fifth embodiment of the nut according to the invention.
Figure 14:
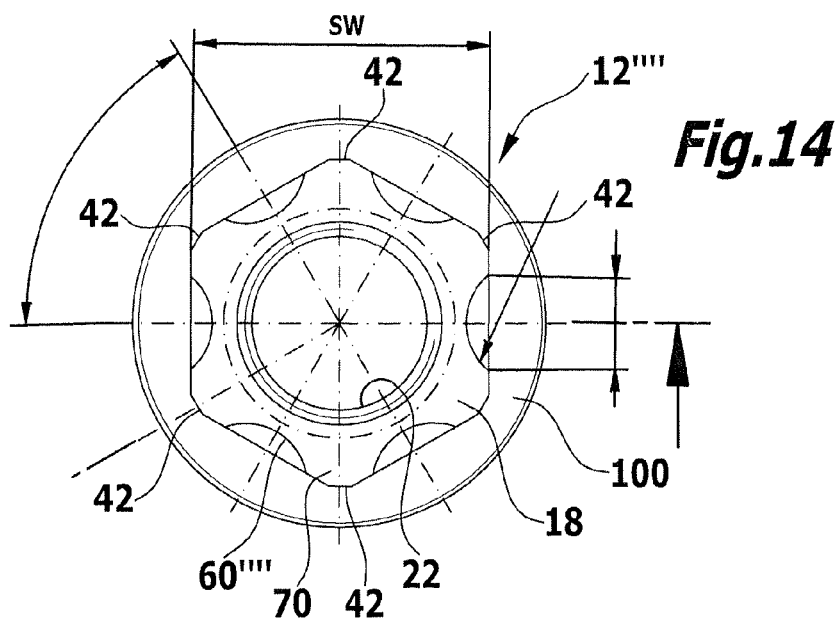
FIG. 14 shows an illustration similar to FIG. 2 of the fifth embodiment of the nut according to the invention.

In a fifth embodiment, illustrated in FIGS. 13 to 15, those parts which are identical to those of the preceding embodiments are likewise given the same reference numerals and so reference can be made in full to the comments on the preceding embodiments with respect to the description thereof.

In contrast to the preceding embodiments, the base area 66'''' of the recesses 60'''' is designed in the fifth embodiment such that it has a maximum depth in the region of the second end face 18, i.e. a maximum distance from the key face plane 46 which is increasingly reduced with increasing extension of the base area 66'''' in the direction of the first end face 16, i.e. the base area 66'''' extends altogether at an acute angle to the central axis 14 and when reaching the pressure base 90 also reaches the key face plane 46.

An extension of the recess 60'''' from the second end face 18 in the direction of the first end face 16 is, for example, limited to a partial section TA of the nut body 12'''', the extension of which is less than half the extension of the nut body 12'''' from the first end face 16 to the second end face 18.

In this embodiment, the radial thickness DG of the wall 34'''' of the thread-bearing casing 30'''' is, therefore, likewise already significantly larger than in the region of the second end face 18 at approximately half the extension of the nut body 12 from the second end face 18 to the first end face 16 and increases further up to the radial thickness DG 1 in the region of the first end face 16 and the pressure flange 100 present in this region.

Figure 16:
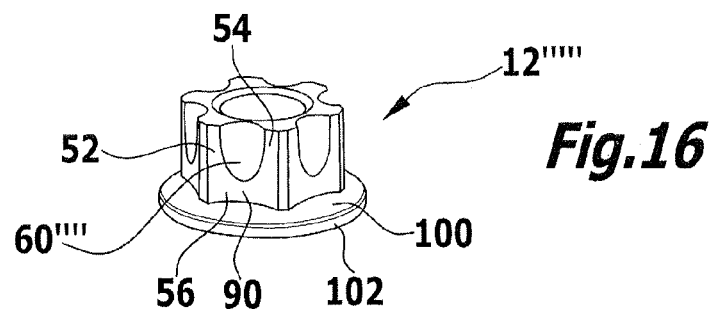
FIG. 16 shows an illustration similar to FIG. 1 of a sixth embodiment of the nut according to the invention.
Figure 18:
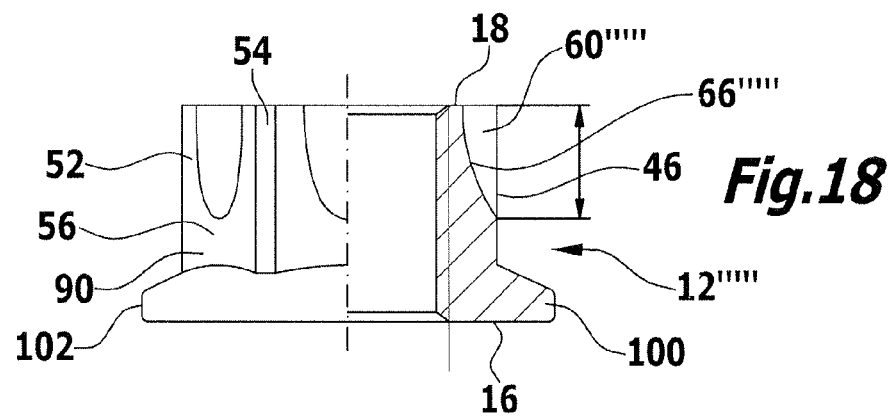
FIG. 18 shows an illustration similar to FIG. 3 of the sixth embodiment of the nut according to the invention.
Figure 17:
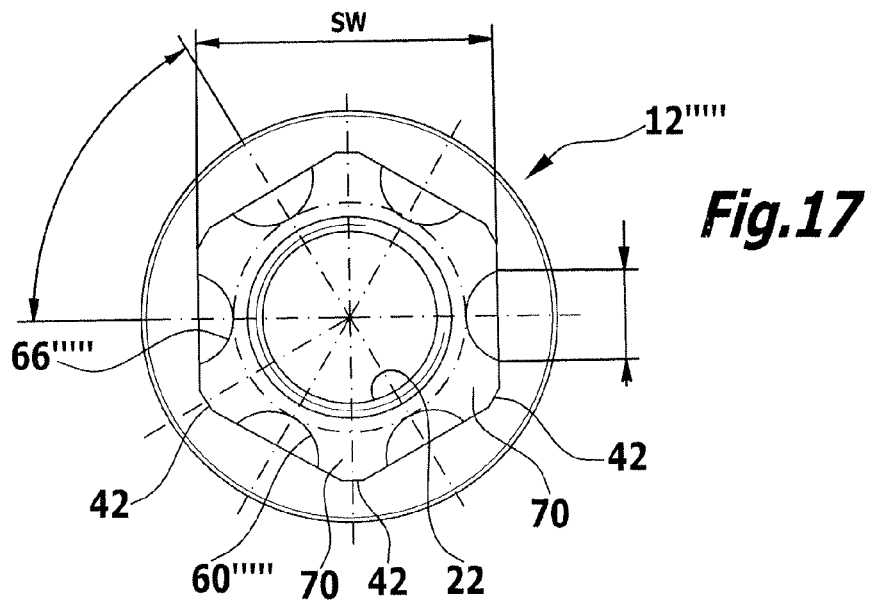
FIG. 17 shows an illustration similar to FIG. 2 of the sixth embodiment of the nut according to the invention.

In a sixth embodiment, illustrated in FIGS. 16 to 18, the base area 66'''' of the recess 60'''', in contrast to the fifth embodiment, is not designed to extend in a straight line but rather extend from the second end face 18 in the direction of the first end face 16 in a concavely curved shape until it reaches the respective key face plane 46.

As for the rest, the sixth embodiment is designed in the same way as the fifth embodiment and so with respect to additional details reference can be made in full to the comments on the fifth embodiment and also on the preceding embodiments.

Figure 19:
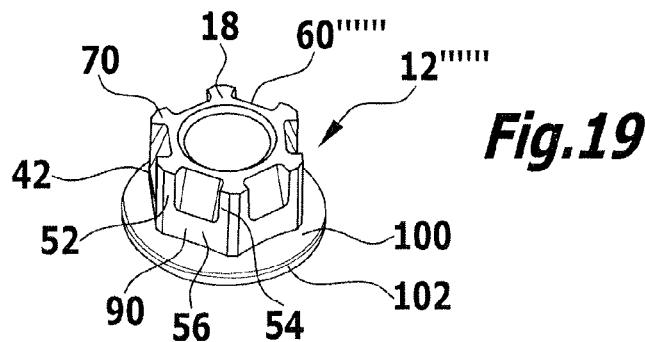
FIG. 19 shows an illustration similar to FIG. 1 of a seventh embodiment of the nut according to the invention.
Figure 21:
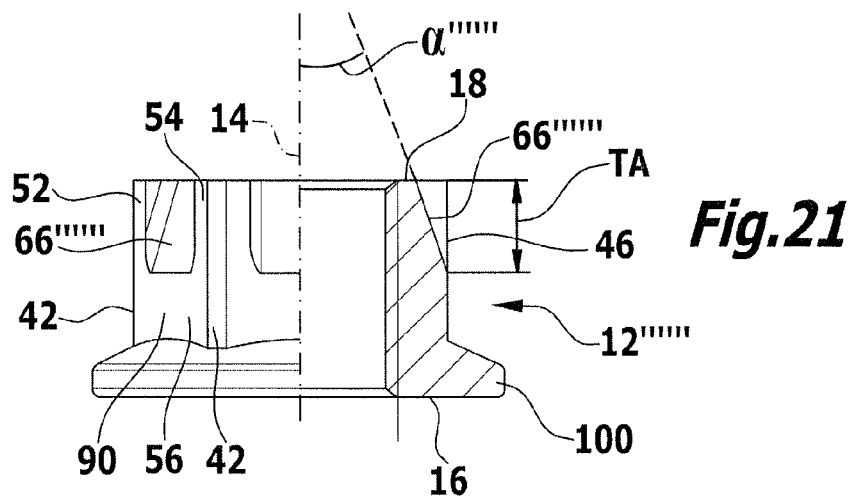
FIG. 21 shows an illustration similar to FIG. 3 of the seventh embodiment of the nut according to the invention.
Figure 20:
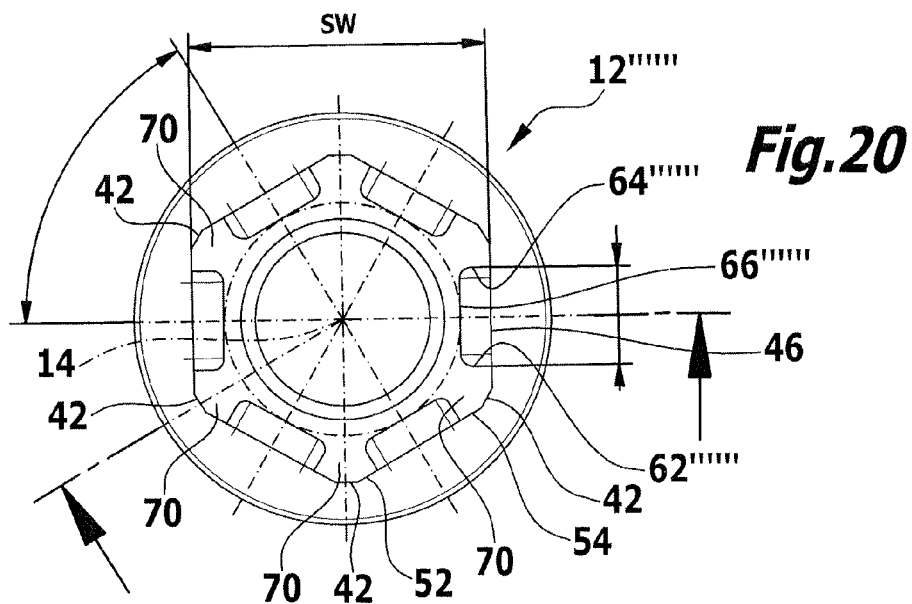
FIG. 20 shows an illustration similar to FIG. 2 of the seventh embodiment of the nut according to the invention.

In a seventh embodiment, illustrated in FIGS. 19 to 21, the recesses 60''''' are designed such that they do not have an approximately U-shaped cross section, as illustrated in conjunction with the embodiments described thus far, but rather a cross section which is approximately rectangular, wherein the side wall areas 62''''' and 64''''' extend into the nut body 12''''' first of all approximately at right angles to the key face plane 46 and then merge with slight curves into the base area 66''''' which extends in the transverse direction 48 approximately parallel to the key face plane 46 between the side wall areas 62 and 64, apart from the rounded transitions to the side wall areas 62''''' and 64''''' and, in addition, proceeding from the second end face 18 extends outwardly with respect to the central axis 14 with increasing extension in the direction parallel to the central axis 14 and, consequently, drops radially outwards towards the pressure flange 100.

As a result, the base area 66''''', proceeding from the second end face 18 of the nut body, extends in the direction of the first end face 16 at an acute angle $\alpha'''''$ to the central axis 14 and drops radially outwards towards the first end face 16 and therefore reaches the key face plane 46 following the extension over the partial section TA.

As for the rest, the additional elements of the nut 10 of the seventh embodiment according to the invention are given the same reference numerals insofar as they are identical to those of the preceding embodiments and so reference can be made in full to the comments on the preceding embodiments.

Figure 22:
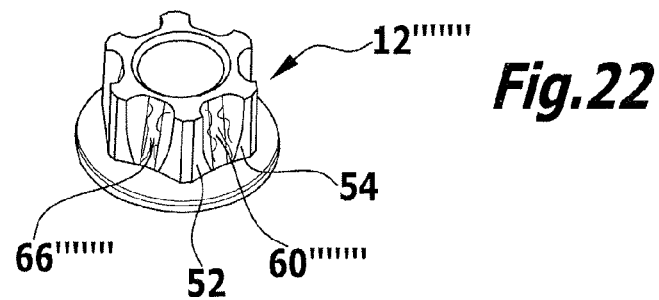
FIG. 22 shows an illustration similar to FIG. 1 of an eighth embodiment of the nut according to the invention.
Figure 24:
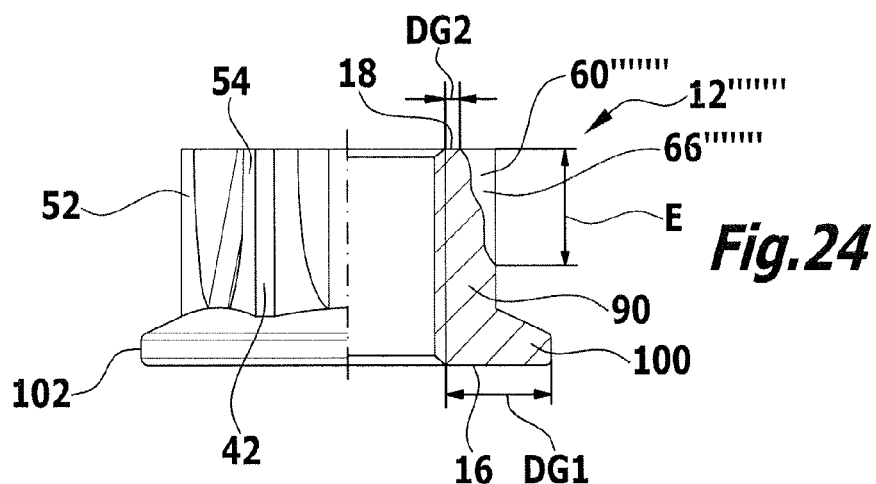
FIG. 24 shows an illustration similar to FIG. 3 of the eighth embodiment of the nut according to the invention.
Figure 23:
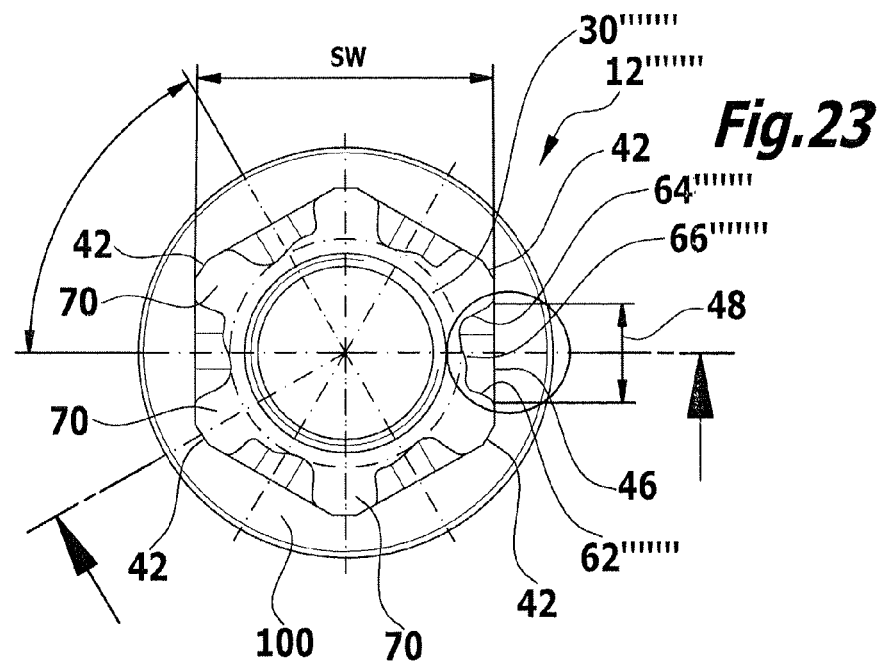
FIG. 23 shows an illustration similar to FIG. 2 of the eighth embodiment of the nut according to the invention.

In an eighth embodiment, illustrated in FIGS. 22 to 24, the recess 60'''''' is of an irregular shape and so, for example, the base area 66'''''' is in a partially irregular wave shape not only in the direction of its extension from the second end face 18 in the direction of the first end face 16 of the nut body 12'''''' but also in the transverse direction 48 between the edge areas 42 and so the entirety of the side wall areas 62'''''' and 64'''''' in conjunction with the base area 66'''''' can have any optional irregular shape, wherein the maximum distance of the base area 66'''''' from the respective key face plane 46 determines the radial thickness DG of the wall 34 of the thread-bearing casing 30''''''.

In this respect, the recesses 60'''''' can extend from the second end face 18 in the direction of the first end face 16 as far as the pressure flange 100, where applicable, however, also only over an extension over a partial section TA, and so a pressure base 90 is formed between the respective recess 60'''''' and the pressure flange 100.

In conjunction with all the preceding embodiments, it is possible to configure the nut according to the invention as a conventional nut, i.e. as a nut, the internal thread 22 of which can be screwed onto the threaded bolt 36 as effortlessly as possible and, in particular, has no clamping torque whatsoever when it is being screwed on or unscrewed and, therefore, has no safety element against loss whatsoever.

Alternatively, it is, however, also possible to design the nuts 10 according to the invention, and, in particular, the nuts 10 according to all the embodiments described above, as check nuts 10S, i.e. to design these nuts such that a clamping torque occurs when the internal thread 22 is screwed onto the threaded bolt 36 and this prevents the nut from being able to be released independently from the state, in which it is screwed tight, on account of the prevailing load conditions, wherein the clamping torque is preferably intended to be predeterminable depending on the purpose of use.

On the basis of the fourth embodiment illustrated above, various alternative or additional possibilities according to the invention will be demonstrated in the following, showing how a defined clamping torque can be predetermined for polygonal nuts in general, in particular, however, also polygonal nuts designed in accordance with the first to eighth embodiments, in a simple manner.

Figure 26:
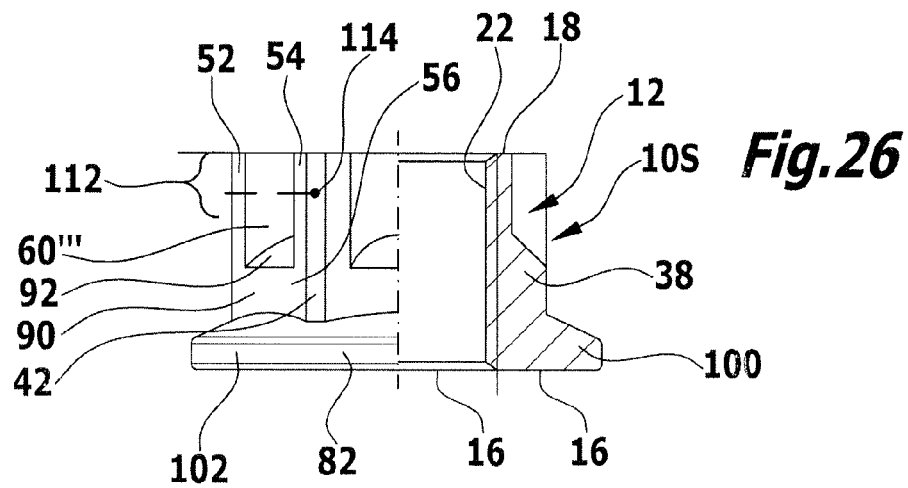
FIG. 26 shows an illustration similar to FIG. 12 of the first version of a check nut according to the invention.
Figure 25:
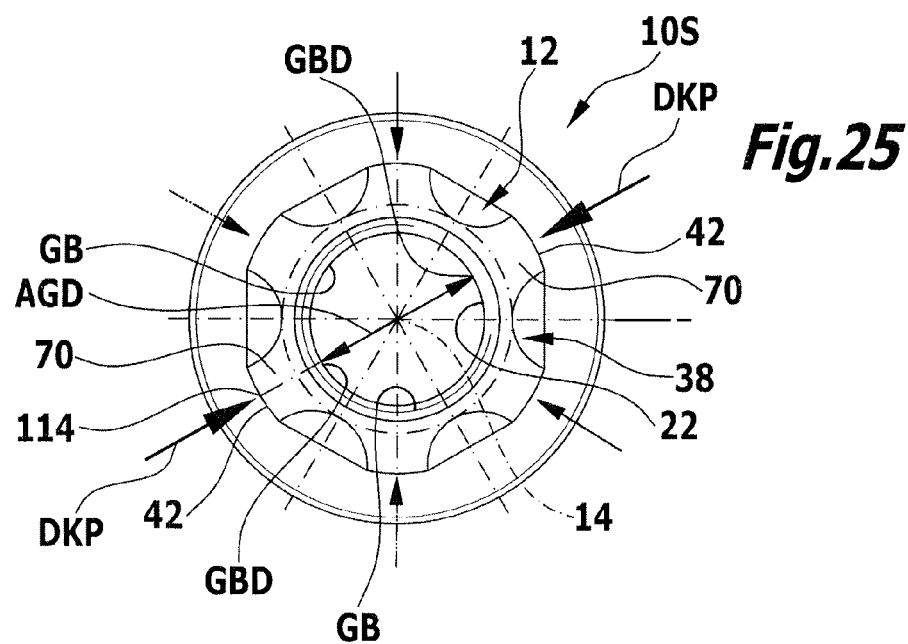
FIG. 25 shows an illustration similar to FIG. 11 of the fourth embodiment of a nut according to the invention, designed as a first version of a check nut.

In a first version of a nut 10S according to the invention, which is illustrated in FIGS. 25 and 26 and the nut body 12 of which has the polygonal section 38, a deformation of the polygonal section 38 occurs as a result of action of a punctiform deformation force DKP, for example on edge sections 42 which are located opposite one another, for example on only two oppositely located edge sections 42 of outer contour supports 70 which are located opposite one another in such a manner that deformation of the polygonal section 38 results in a plastic deformation of the internal thread 22 in such a manner that, for example, thread areas GBD, which are located in the region of the outer contour supports 70 acted upon by the deformation forces acting punctiformly and opposite one another with respect to the central axis 14, are at a smaller distance AGD from one another than thread areas GB which are located outside the thread areas GBD and so in the thread areas GBD, which are deformed when this nut 10S according to the first version is screwed on and the distance AGD of which is less than that predetermined by the standard, the internal thread 22 will be widened again to the measurement of the threaded bolt 36, which is to be screwed in, as a result of elastoplastic deformation of the polygonal section 38 when the threaded bolt 36 is screwed with the external thread 35 into the internal thread 22 and so the polygonal section 38 which has a global elastoplastic shape stability primarily experiences an elastoplastic change in shape as a whole and, therefore, subsequently generates a reaction force, with which the deformed thread areas GBD press on the external thread 35 of the threaded bolt 36 to be screwed in and, therefore, generate the desired clamping torque.

Since, in this embodiment, the plastic deformation of the polygonal section 38 generated by the punctiform deformation forces DKP primarily represents a global deformation of the polygonal section 38, the forces, which are generated by the elastoplastic change in shape and with which the deformed thread sections GBD act on the external thread 35 of the threaded bolt 36 to be screwed in, are likewise primarily determined by the global elastoplastic form stability of the polygonal section 38.

The action of the punctiform deformation forces DKP on the edge sections 42 is preferably brought about in an upper area 112 of the edge areas 42 located close to the second end face 18 since, in this upper area 112, the polygonal section 38 has a greater plastic deformability than in the region of the pressure base 90 or the pressure flange 100 and so the distance covered by the external thread 68 of the threaded bolt 36 through the area deformed with a minimum distance AGD is smaller.

In this respect, the upper area 112 preferably extends from the second end face 18 as far as, at the most, half the extension of the recess 60''' from the second end face 18 in the direction of the first end face 16 or the pressure side 82, preferably as far as a third of the extension of the recess 60''' from the second end face 18 in the direction of the first end face 16.

In the first version of the check nut 10S according to the invention, the deformation forces DKP which act punctiformly are aligned such that they act radially and transversely to the central axis 14, preferably at right angles to it.

It is, however, also possible to have the deformation forces DKP, which act punctiformly, acting either with a component in the direction of the first end face 16 or both with a component in the direction of the second end face 18.

The forces DKP which act punctiformly leave behind on the nut body 12 punctiform pressure points 114, at which their action is apparent.

Figure 28:
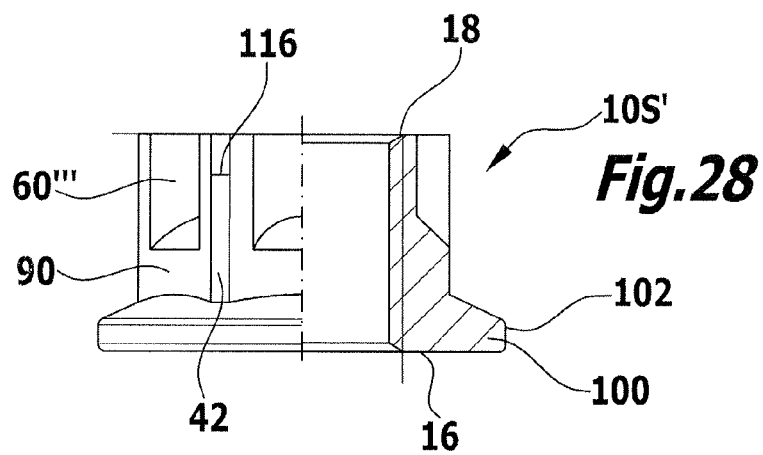
FIG. 28 shows an illustration similar to FIG. 26 of the second version of the check nut according to the invention.
Figure 27:
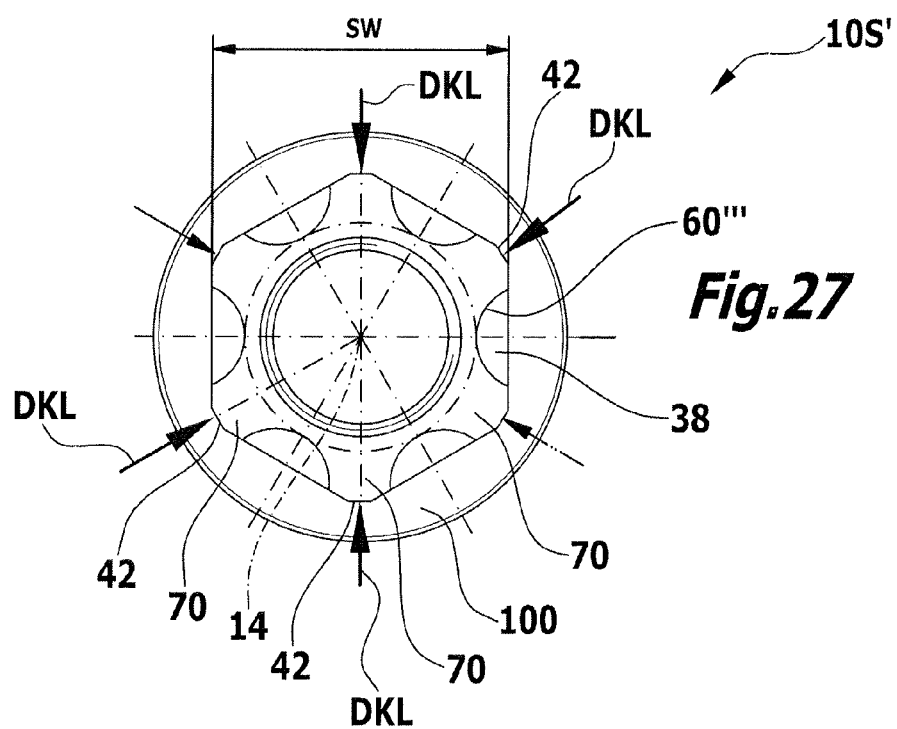
FIG. 27 shows an illustration similar to FIG. 25 of a second version of a check nut according to the invention.

In a second version of a check nut 10S' designed in accordance with the invention, illustrated in FIGS. 27 and 28, the action of the deformation forces is not in the form of deformation forces DKP which act punctiformly but rather in the form of deformation forces DKL which act linearly on the edge areas 42 in the upper area 112 and these likewise lead to deformations of the polygonal section 38 similar to the manner described in conjunction with the first version, wherein essentially a deformation of the polygonal section 38 as a whole likewise takes place with the deformation forces DKL which act linearly.

In the same way as with the first version, the deformation forces DKL which act linearly can be two deformation forces DKL which act in pairs opposite one another with respect to the central axis 14 or several acting deformation forces DKL which are preferably arranged at regular respective angular distances with respect to the central axis 14, wherein deformations of the polygonal section 38 occur which are approximately similar to the first version and wherein the deformation forces DKL leave behind linear pressure points 116 on the nut body 12.

Also in the case where the deformation forces DKL according to the second version, which act linearly, are used, the deformation forces DKL which act linearly are aligned such that they extend transversely to the central axis 14, for example at right angles to it.

It is, however, also possible to have the deformation forces DKL, which act linearly, both acting with a component in the direction of the first end face 16 or both with a component in the direction of the second end face 18.

In a third version of a check nut according to the invention, illustrated in FIGS. 29 and 30, a nut body 12 according to the fourth embodiment is likewise used and the action in this case does not take place in the region of the outer contour supports 70 but rather in the base area 66'' of the recesses 60''', wherein in the third version deformation forces DKP which act punctiformly are likewise used in the upper area 112 and these lead primarily to a deformation of partial areas of the thread-bearing casing 30 which border on the punctiform pressure points 114 and, therefore, generate deformed thread areas GBD'', wherein the deformation is localized to a greater extent since, in contrast to the outer contour supports 70, the thread-bearing casing 30 already experiences a primarily local, elastoplastic deformation on account of a smaller thickness and this deformation likewise leads to a local, elastoplastic deformation of the internal thread 22 and, therefore, to a localized deformed thread area GBD''.

When such a check nut 10S'' according to the third version is screwed onto the external thread 35 of a threaded bolt 36, the force generated by the elastoplastic deformation and acting on the deformed thread areas GBD'' is generated in that the local plastic deformation of the thread-bearing casing 30 will be reduced at least partially primarily as a result of a local elastoplastic return to shape of the thread-bearing casing 30 when the threaded bolt 36 is screwed in.

In this respect, the local, elastoplastic return to shape can, however, also overlap, in addition, with an overall deformation of the polygonal section 38 which allows the deformed thread areas GBD'' to move away from one another again to such an extent that the threaded bolt 36 can be screwed into the internal thread 22 but with generation of the desired clamping torque.

The deformation which is generated primarily locally as a result of action on the base area 66''' of the recess 60''' may, however, also be combined, in addition, with a primarily global deformation of the polygonal section 38 as a result of supplementary action by deformation forces DKP or DKL on the edge areas 42, as described in conjunction with the first or second version.

The punctiformly effective deformation forces DKP according to the third version are likewise preferably directed transversely to the central axis 14, in particular at right angles to it.

It is, however, also possible to give these punctiformly acting deformation forces DKP a component in the direction of the first end face 16 or the second end face 18.

Figure 32:
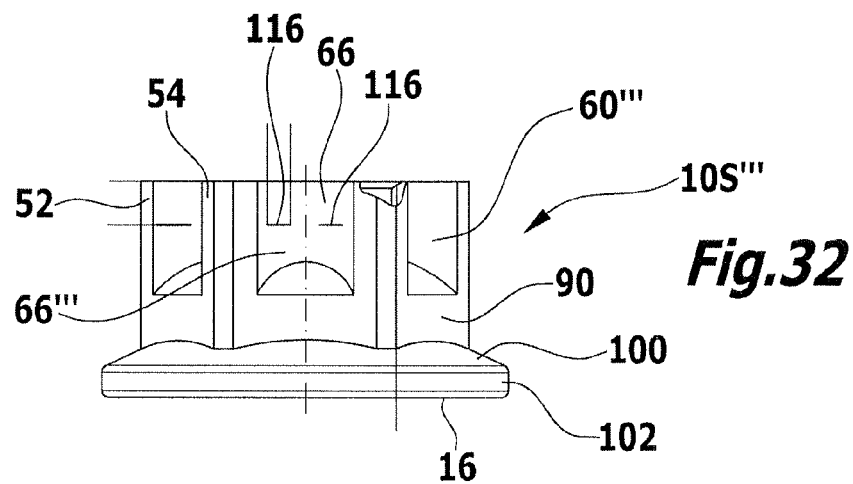
FIG. 32 shows an illustration similar to FIG. 26 of the fourth version of a check nut according to the invention.
Figure 31:
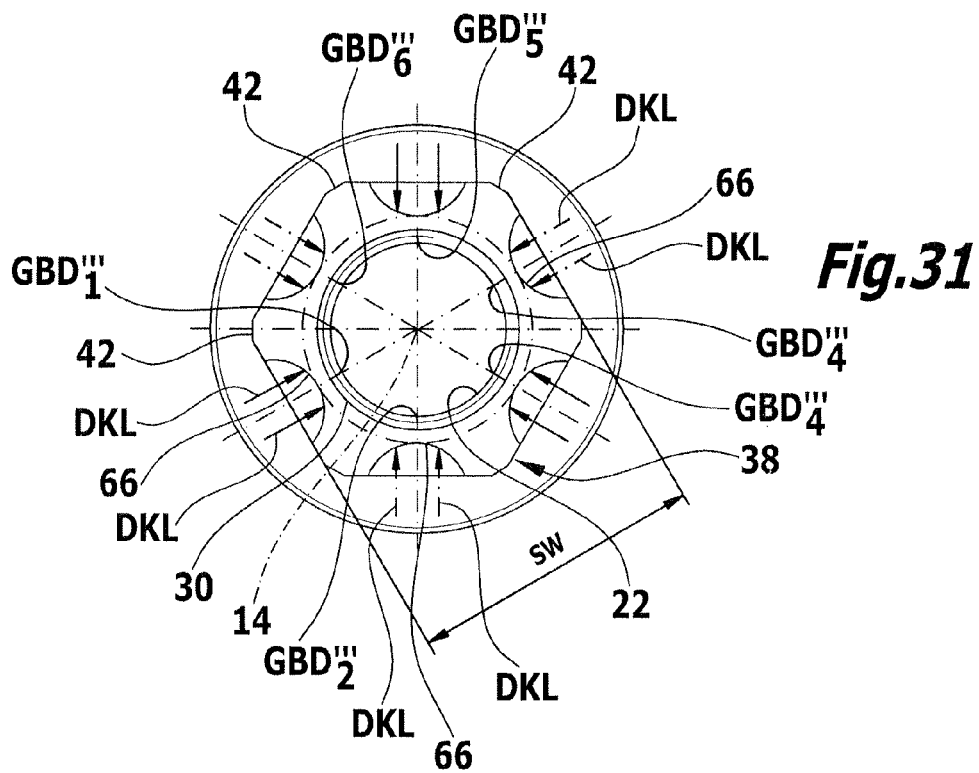
FIG. 31 shows an illustration similar to FIG. 25 of a fourth version of a check nut according to the invention.

In a fourth version of a check nut 10S''' according to the invention, illustrated in FIG. 31 and FIG. 32, there is no punctiform action in the base area 66 but rather deformation forces DKL which act linearly are used and in this version they are effective, for example, in all the base areas 66 of the polygonal section 38 in order to generate, in accordance with the number of base areas 66, several areas around the central axis 14, for example, the deformed thread areas GBD'''1 to GBD'''6 which result primarily due to local deformation of the thread-bearing casing 30 and so these six deformed thread areas GBD'''1 to GBD'''6 arranged around the central axis 14 are responsible for the clamping torque of the internal thread 22 which is to be generated when this thread is screwed onto a threaded bolt 36.

The linearly acting deformation forces DKL provided in the fourth version extend, for example, transversely to the central axis 14, preferably at right angles to it or also with a component in the direction of the first end face 16 or the second end face 18 and leave behind the linear pressure points 116.

In principle, the sum and direction of linearly deformed thread areas GBD'''1 to GBD'''6 can vary in pairs.

As illustrated in a fifth version of a check nut 10S'''' according to the invention in FIGS. 33 and 34, areally acting forces DKF can also be used alternatively to punctiformly acting forces DKP or linearly acting forces DKL and in the fifth version they act areally in the base area 66'' of the recesses 60''', generating areal pressure points 118, and, therefore, generate an elastoplastic deformation of the thread-bearing casing 30 which is still primarily local but distributed over a greater surface area and, therefore, deformed thread areas GBD'''' which are formed over a large area, corresponding to their areal action.

Such deformation forces DKF which act areally in the base areas 66'' can also be effective either in a pair of base areas 66'' which are located opposite one another or in three individual or several oppositely located base areas 66'' in pairs or, however, also combined with deformation forces acting in the edge areas 42, whether they be punctiform deformation forces DKP or linear deformation forces DKL or also, where applicable, areal deformation forces DKF.

In the fifth version, the deformation forces DKF which act areally are primarily aligned such that they act transversely to the central axis 14, wherein the deformation forces DKF which act areally can, however, also both have a respective component in the direction of the first end face 16 or in the direction of the second end face 18 in order to be able to generate with their action in the region of a partial surface area an enhanced plastic deformation, in particular a primarily local, plastic deformation in the thread-bearing body 30 and, therefore, also the corresponding, deformed thread area GBD'''' of the internal thread 22.

Figure 36:
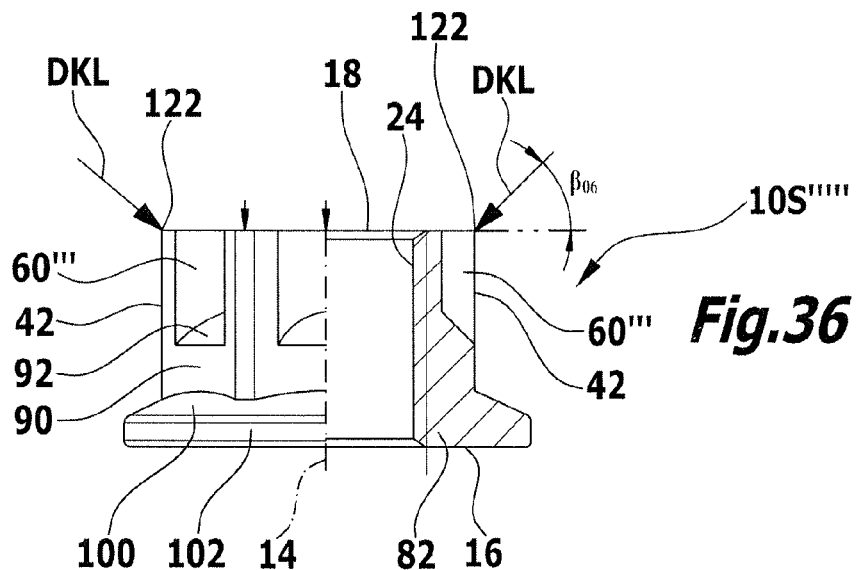
FIG. 36 shows an illustration similar to FIG. 26 of the sixth version of the check nut according to the invention.
Figure 35:
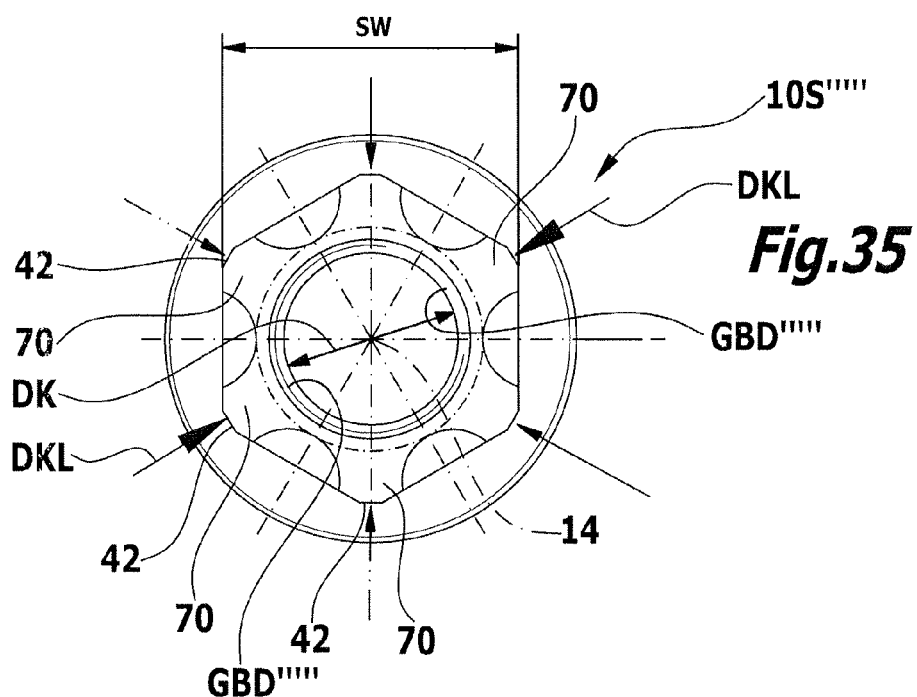
FIG. 35 shows an illustration similar to FIG. 25 of a sixth version of a check nut according to the invention.

In a sixth version of a check nut 10S'''' according to the invention, illustrated in FIGS. 35 and 36, the edge areas 42 are acted upon not in the upper area 112 but, for example, via deformation forces DKL which act linearly on an upper outer edge 122, which borders on the second end face 18, between the second end face 18 and, for example, two edge areas 42 which are located opposite one another or several edge areas 42 which are located opposite one another in respective pairs and so the deformation forces DKL act on the respective outer contour supports 70 and, therefore, lead to a primarily global deformation of the polygonal section 38 immediately adjoining the second end face 18 and so deformed thread areas GBD'''' result, in particular, in the region of the thread turns of the internal thread 32 directly adjoining the second end face 18.

In this respect, the deformation forces DKL which act linearly are preferably directed such that they act, on the one hand, in the direction of the central axis 14 and, on the other hand, in the direction of the first end face 16 or pressure side 82.

Also, in this embodiment, only two deformation forces DKL which are located opposite one another with respect to the central axis 14 can be effective or also several deformation forces DKL which are located opposite one another in respective pairs.

In a seventh version of a check nut 10S'''' according to the invention, illustrated in FIGS. 37 and 38, axial deformation forces DKAL, which are aligned parallel to the central axis 14, act linearly, namely aligned radially to the central axis 14, on the second end face 18 in the region of the thread-bearing casing 30, thereby generating linear pressure points 120 and lead to a plastic deformation, which extends around the central axis 14, of the first thread turn 24 of the internal thread 22 adjoining the second end face 18 and this internal thread experiences, for example, altogether a narrowing with respect to its core hole diameter DK, as a result, and has threaded areas which are deformed in the direction of the central axis 14 with respect to a standard course and the distance between which in relation to the standard pitch is reduced. This deformation leads altogether to an elastoplastic widening of the polygonal section 38, in particular, close to the second end face 18 when the threaded bolt 36 is screwed into the internal thread 22, wherein this elastoplastic widening again leads to reaction forces which press the first thread turns against the external thread 35 of the threaded bolt 36 which is screwed in and are, therefore, responsible for the desired clamping torque.

In general, it is possible with the first to seventh versions according to the invention to combine the plastic deformations, which can be generated by the deformation forces DK and have an effect on the distance of threaded areas from the central axis 18 and the course of the thread turns relative to one another, with one another in order to achieve the desired clamping torque when the internal thread is screwed onto and screwed off a threaded bolt also, for example, by way of multiple deformations of the polygonal section 38.

A nut 10 according to the invention may preferably be produced from a material with a bainitic or ferritic-perlitic basic structure according to FIG. 39. An advantageous combination of tensile strength and deformability will be achieved in the case of both types of material as a result of a concerted control of the structural transformation.

As a result of alloying microalloy elements and thermomechanical pretreatment processes properties are generated prior to the actual transformation process which lead as a result of the actual transformation (cooling from the forging heat during hot forming processes or increasing the dislocation during cold forming processes) to defined structurally mechanical properties which should result, for example, following the actual transformation process by way of a special heat treating process when conventional cold heading products are used.

Proceeding on the basis of a material with such a bainitic or ferritic-perlitic basic structure, a cold transformation takes place, for example, or a flow pressing of a starting material, for example a wire or a bar material in at least one transformation step or in several transformation steps up to a shape of the nut body 12 according to one of the embodiments described above and/or one of the versions described above.

With this transformation process of the material specified above, a hardening of the material takes place as a result of formation of dislocations and/or an increase in the dislocation density on account of the inhomogeneous cross-sectional formation in different thicknesses, wherein a greater deformation occurs, in particular, in the area with a thinner cross section than in areas with a correspondingly thicker cross section.

The transformation leads, in particular, to an increase in the strength by at least 5% in comparison with the starting material, even better by at least 10% or even better at least 20% proceeding on the basis of strength values of the starting material.

For example, a greater hardening of the thread-bearing casing 30 of the nut body 12 is brought about in the region of the recesses 60 and this contributes to an improved stabilization of the internal thread 22 against any deformation during stressing by the threaded bolt 36. In this respect, as a result of the hardening density gradients generated by the transformation proceeding from the key faces 44 and increasing towards the thread-bearing casing 30, it is possible to dispense with a possible heat treatment following the transformation process since an adequate hardness can be achieved in the range of higher, structurally mechanical requirements, for example for the thread-bearing casing 30, as a result of the combination of a greater hardening density and a material with a bainitic or ferritic-perlitic basic structure.

For example, the hardness of the thread-bearing casing 30 is for fine threads in the range of 180 to 360 HV, for regular threads in the range of 110 to 360 HV.

As example for a precipitation-hardening, ferritic-perlitic material or a precipitation-hardening, ferritic-perlitic steel which has a good cold deformability, reference is made, for example, to the material 24MnSiV5 or to the material 27MnSiV6 40, wherein the material last named has the properties listed in FIG. 40 as well as the chemical composition specified in FIG. 40.

In this respect, the strength is achieved by way of solid solution hardening with Si, Mn and/or precipitation hardening with Va, Nb, Ti.

The invention claimed is:

1. Nut, comprising a nut body defining a bore, the bore provided or providable with an internal thread, the bore having a substantially cylindrical cross section, said nut body having a polygonal section with a polygonal outer contour, the polygonal outer contour having edge areas and key faces located between the edge areas, the key faces extending in key face planes in a manner confirming to standards, the key face planes defining the polygonal outer contour, the nut body in each key face has a recess extending into the nut body in the direction of the bore proceeding from the respective key face planes, the recesses extend into the nut body proceeding from each key face plane of the polygonal section, the recesses extend from the respective key face plane as far as a thread-bearing casing surrounding the bore in a stabilizing manner, and the thread-bearing casing has, proceeding from an external diameter of the bore, a radial minimum thickness of 0.05 times the external diameter of the bore, the nut body has a first end face designed as a pressure side with a pressure surface and a second end face facing away from the pressure side, wherein the recess extends as far as the second end face, wherein a pressure flange is provided on the pressure side, the pressure flange extending radially beyond the polygonal section, and wherein the recess extends over a partial section of the nut body so that a pressure base is formed between the recess and the pressure flange;
wherein the thread-bearing casing has at least partially an increasing radial minimum thickness with increasing extension in a direction from the second end face towards the pressure side.

2. Nut, comprising a nut body defining a bore, the bore provided or providable with an internal thread, said nut body having a polygonal section with a polygonal outer contour, the polygonal outer contour having edge areas and, key faces located between the edge areas, the key faces extending in key face planes in a manner conforming to standards, the key face planes defining the polygonal outer contour, the nut body as a first end face designed as a pressure side with a pressure surface and a second end face facing away from the pressure side, wherein the nut body in each key face has a recess extending into the nut body in the direction of the bore proceeding from the respective key face plane, the recess extends into the nut body proceeding from each key face plane of the polygonal section, the recess extends from the respective key face plane as far as a thread-bearing casing surrounding the bore in a stabilizing manner, and the recess extends as far as the second end face, the recess extends as far as a pressure flange provided on the pressure side and a radial minimum thickness of the thread-bearing casing in the region of the pressure side is greater than in the region of the second end face, the nut body is produced from steel with a ferritic-perlitic structure.

3. Nut as defined in claim 2, wherein the bainitic or ferritic-perlitic structure has strength properties enhanced as a result of a thermos-mechanical pretreatment.

4. Nut as defined in claim 2, wherein as a result of controlling the structure transformation and as a result of reshaping the ferritic-perlitic structure has a hardness in the range of 100 to 370 HV, even better 170 to 370 HV, even better 180 to 360 HV, for fine threads in the thread-bearing case without any subsequent thermal treatment.

5. Nut, comprising a nut body defining a bore, the bore provided or providable with an internal thread, the bore having a substantially cylindrical cross section, said nut body having a polygonal section with a polygonal outer contour, the polygonal outer contour having edge areas and key faces located between the edge areas, the key faces extending in key face planes in a manner confirming to standards, the key face planes defining the polygonal outer contour, the nut body in each key face has a recess extending into the nut body in the direction of the bore proceeding from the respective key face planes, the recesses extend into the nut body proceeding from each key face plane of the polygonal section, the recesses extend from the respective key face plane as far as a thread-bearing casing surrounding the bore in a stabilizing manner, and the thread-bearing casing has, proceeding from an external diameter of the bore, a radial minimum thickness of 0.05 times the external diameter of the bore, the nut body has a first end face designed as a pressure side with a planar pressure surface and a second end face facing away from the pressure side, wherein the recess extends as far as the second end face, wherein a pressure flange is provided on the pressure side, the pressure flange extending radially beyond the polygonal section, and wherein the recess extends over a partial section of the nut body so that a pressure base is formed between the recess and the pressure flange;
wherein the recess defines a base area that includes a first portion with a first angle relative to a central axis of the nut body and a second portion with a second angle relative to the central axis, the second angle being greater than the first.

6. Nut as defined in claim 5, wherein the first angle is zero.

7. Nut as defined in claim 5, wherein the first portion is closer to the second end face than the second portion and the second portion is closer to the first end face than the first portion.

8. Nut as in claim 5, wherein first and second portions are immediately adjacent to one another.

9. Nut, comprising a nut body defining a bore, the bore provided or providable with an internal thread, the bore having a substantially cylindrical cross section, said nut body having a polygonal section with a polygonal outer contour, the polygonal outer contour having edge areas and key faces located between the edge areas, the key faces extending in key face planes in a manner confirming to standards, the key face planes defining the polygonal outer contour, the nut body in each key face has a recess extending into the nut body in the direction of the bore proceeding from the respective key face planes, the recesses extend into the nut body proceeding from each key face plane of the polygonal section, the recesses extend from the respective key face plane as far as a thread-bearing casing surrounding the bore in a stabilizing manner, and the thread-bearing casing has, proceeding from an external diameter of the bore, a radial minimum thickness of 0.05 times the external diameter of the bore, the nut body has a first end face designed as a pressure side with a pressure surface and a second end face facing away from the pressure side, wherein the recess extends as far as the second end face, and wherein a pressure flange is provided on the pressure side, the pressure flange extending radially beyond the polygonal section, and wherein the recesses have a cross-sectional shape which is determined by a base area and side wall areas which adjoin the base area and wherein the recesses extend transversely to the respective key face plane, wherein the nut body has a minimum radial thickness at the base area and increases in a direction extending transversely along the side wall areas; and
wherein the thread-bearing casing has at least partially an increasing radial minimum thickness with increasing extension in a direction from the second end face toward the pressure side.

10. Nut as in claim 9, the recesses extend into the nut body proceeding from each key face plane of the polygonal section to a base area, the base area of the recess has a first portion with a first angle relative to a central axis of the bore and a second portion with a second angle relative to the central axis, the second angle being greater than the first angle.

11. Nut as in claim 10, wherein the first angle is zero.

12. Nut as defined in claim 10, wherein the first portion is closer to the second end face than the second portion and the second portion is closer to the first end face than the first portion.

13. Nut as in claim 10, wherein first and second portions are immediately adjacent to one another.

14. Nut as in claim 10, wherein the recess extends at least as far as a pressure flange provided on the pressure side.

15. Nut, comprising a nut body defining a bore, the bore provided or providable with an internal thread, the bore having a substantially cylindrical cross section, said nut body having a polygonal section with a polygonal outer contour, the polygonal outer contour having edge areas and key faces located between the edge areas, the key faces extending in key face planes in a manner confirming to standards, the key face planes defining the polygonal outer contour, the nut body in each key face has a recess extending into the nut body in the direction of the bore proceeding from the respective key face planes, the recesses extend into the nut body proceeding from each key face plane of the polygonal section, the recesses extend from the respective key face plane as far as a thread-bearing casing surrounding the bore in a stabilizing manner, and the thread-bearing casing has, proceeding from an external diameter of the bore, a radial minimum thickness of 0.05 times the external diameter of the bore, the nut body has a first end face designed as a pressure side with a pressure surface and a second end face facing away from the pressure side, wherein the recess extends as far as the second end face, and wherein a pressure flange is provided on the pressure side, the pressure flange extending radially beyond the polygonal section, and wherein the recesses have a cross-sectional shape which is determined by a base area and side wall areas which adjoin the base area and wherein the recesses extend transversely to the respective key face plane, wherein the nut body has a minimum radial thickness at the base area and increases in a direction extending transversely along the side wall areas;

the recesses extend into the nut body proceeding from each key face plane of the polygonal section to a base area, and the thread-bearing casing has, proceeding from an external diameter of the bore to the base area, a radial minimum thickness, the radial minimum thickness is smaller at the second end face than at an end of the recess opposite the second end face and the base area of the recess has a first portion with a first angle relative to a central axis of the bore and a second portion with a second angle relative to the central axis, the second angle being greater than the first angle.

16. Nut as defined in claim 15, wherein the first angle is zero.

17. Nut as defined in claim 15, wherein the first portion is closer to the second end face than the second portion and the second portion is closer to the first end face than the first portion.

18. Nut as in claim 15, wherein first and second portions are immediately adjacent to one another.

19. Nut as in claim 15, wherein the recess extends at least as far as a pressure flange provided on the pressure side.

\* \* \* \* \*